(12) United States Patent
Dokiya et al.

(10) Patent No.: US 11,906,919 B2
(45) Date of Patent: Feb. 20, 2024

(54) RECORDING MEDIUM DETERMINATION DEVICE, IMAGE FORMATION DEVICE, AND RECORDING MEDIUM DETERMINATION METHOD

(71) Applicant: Konica Minolta, Inc., Tokyo (JP)

(72) Inventors: Shohei Dokiya, Toyohashi (JP); Daisuke Kobayashi, Hino (JP); Masahiko Takahashi, Hino (JP); Makoto Ooki, Toyohashi (JP); Takafumi Yuasa, Toyokawa (JP); Takaki Uemura, Seto (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/737,517

(22) Filed: May 5, 2022

(65) Prior Publication Data
US 2022/0373953 A1    Nov. 24, 2022

(30) Foreign Application Priority Data

May 24, 2021  (JP) ................................ 2021-086688
Sep. 14, 2021  (JP) ................................ 2021-149228

(51) Int. Cl.
*G03G 15/00*   (2006.01)
(52) U.S. Cl.
CPC ................. *G03G 15/5029* (2013.01)
(58) Field of Classification Search
None
See application file for complete search history.

(56) References Cited

U.S. PATENT DOCUMENTS

2005/0219305 A1   10/2005   Kikuchi et al.
2012/0139991 A1    6/2012   Powers et al.
(Continued)

FOREIGN PATENT DOCUMENTS

EP         1357522 A2    10/2003
JP      2006-016166 A     1/2006
(Continued)

OTHER PUBLICATIONS

EPO Communication dated Oct. 17, 2022 forwarding the extended European Search Report for European Patent Application No. 22172481.8, 8 pages.

*Primary Examiner* — Sevan A Aydin
(74) *Attorney, Agent, or Firm* — Squire Patton Boggs (US) LLP

(57) ABSTRACT

A recording medium determination device includes a light emitter, a light detector, and a hardware processor. The light emitter emits inspection light to a recording medium. The light detector detects incident light including at least one of diffuse reflected light of the inspection light emitted to the recording medium and fluorescent light excited by the inspection light in the recording medium. The hardware processor makes a determination depending on a property of the recording medium based on a detection result of first incident light of the incident light in accordance with first inspection light of the inspection light and second incident light of the incident light in accordance with second inspection light of the inspection light obtained by the light detector. The second inspection light has an intensity whose peak wavelength is shorter than the peak wavelength of the first inspection light.

19 Claims, 23 Drawing Sheets

(56) References Cited

U.S. PATENT DOCUMENTS

2017/0214812 A1\* 7/2017 Tomishima ........ H04N 1/00716
2019/0162672 A1 5/2019 Sakakibara

FOREIGN PATENT DOCUMENTS

| JP | 2006-110952 A | 4/2006 |
| WO | WO 2018/029884 A1 | 2/2018 |
| WO | WO 2018/029884 A1 | 6/2019 |

\* cited by examiner

MEDIUM INSPECTION UNIT 1200

ELEMENT SUBSTRATE 1201

ARRANGEMENT OF LIGHT EMITTING ELEMENTS 1411, 1412, 1413

FIG.27

|  | RANGE OF RATIO OF AMOUNT OF REFLECTED LIGHT | | |
|---|---|---|---|
|  | LIGHT EMITTING ELEMENT 1411 | LIGHT EMITTING ELEMENT 1412 | LIGHT EMITTING ELEMENT 1413 |
| TYPE OF RECORDING MEDIUM#1 | r11a~r11b | 1 | r21a~r21b |
| TYPE OF RECORDING MEDIUM#2 | r12a~r12b | 1 | r22a~r22b |
| ⋮ | ⋮ | ⋮ | ⋮ |
| TYPE OF RECORDING MEDIUM#N | r1Na~r1Nb | 1 | r2Na~r2Nb |

MEDIUM INSPECTION UNIT 1200

SECOND ELEMENT SUBSTRATE 1902

ARRANGEMENT OF LIGHT EMITTING ELEMENTS 1911, 1912, 1913, 1914

MEDIUM INSPECTION UNIT 1200

FIRST ELEMENT SUBSTRATE 2001

SECOND ELEMENT SUBSTRATE 2002

APPEARANCE OF RECORDING MEDIUM DETERMINATION DEVICE

ESSENTIAL CONFIGURATION

RECORDING MEDIUM DETERMINATION DEVICE, IMAGE FORMATION DEVICE, AND RECORDING MEDIUM DETERMINATION METHOD

CROSS-REFERENCE TO RELATED APPLICATIONS

The entire disclosure of Japanese Patent Application No. 2021-086688 filed on May 24, 2021 and Japanese Patent Application No. 2021-149228 filed on Sep. 14, 2021 is incorporated herein by reference in its entirety.

BACKGROUND

1. Technological Field

The present invention relates to a recording medium determination device, an image formation device, and a recording medium determination method.

2. Description of the Related Art

In an image formation device that provides a recording medium such as paper with a color material to form an image, a recording medium determination device that determines the class of the recording medium is conventionally used. By adjusting conditions for image formation (for example, a conveyance condition and a color material fixing condition) in accordance with the determined class of the recording medium, an image is formed at higher quality.

A known recording medium determination device makes a determination depending on a property of a recording medium based on the received amount of reflected light and/or fluorescent light when inspection light in a predetermined wavelength region is emitted to the recording medium, and determines the class of the recording medium based on a result of this determination. Properties of the recording medium to be targeted for the determination include the material, presence/absence of a fluorescent whitening agent, degree of surface gloss, and the like. In JP 2006-16166 A, for example, inspection light in an ultraviolet wavelength region is emitted to a recording medium to detect the received amount of fluorescent light, thereby determining the presence/absence of a fluorescent whitening agent. The degree of gloss is determined by detecting the amount of diffuse reflected light of the inspection light. In WO 2018/029884, a property of a recording medium is determined by causing three or more light emitting elements to sequentially emit light one by one to illuminate the recording medium and detecting reflected light therefrom by a common light receiver.

SUMMARY

In the above-described conventional technology, however, it is difficult to make a correct determination depending on a property of the recording medium in a case in which the amount of received light varies due to a factor other than the property targeted for determination. For example, in a case in which the reflected amount of inspection light varies due to a difference in basis weight between recording media or the like, it is not possible to determine whether the variation is caused by the property targeted for determination of the recording medium or caused by another factor such as the basis weight. In this manner, the above-described conventional technology raises problems in that it may be difficult to make a correct determination depending on a property of the recording medium, and an erroneous determination depending on the class of the recording medium is likely to occur.

The present invention has an object to provide a recording medium determination device, an image formation device, and a recording medium determination method that enable the class of a recording medium to be determined more appropriately.

To achieve at least one of the above-mentioned objects, according to an aspect of the present invention, a recording medium determination device includes:
  a light emitter that emits inspection light to a recording medium;
  a light detector that detects incident light including at least one of diffuse reflected light of the inspection light emitted to the recording medium and fluorescent light excited by the inspection light in the recording medium; and
  a hardware processor that makes a determination depending on a property of the recording medium based on a detection result of first incident light of the incident light in accordance with first inspection light of the inspection light and second incident light of the incident light in accordance with second inspection light of the inspection light obtained by the light detector,
wherein
  the first inspection light has an intensity whose peak wavelength is more than or equal to 750 nm and less than or equal to 1100 nm, and
  the second inspection light has an intensity whose peak wavelength is shorter than the peak wavelength of the first inspection light.

According to another aspect of the present invention, an image formation device includes:
  the recording medium determination device; and
  an image former that provides the recording medium with a color material to form an image.

According to still another aspect of the present invention, a recording medium determination method uses a recording medium determination device including a light emitter that emits inspection light to a recording medium, and a light detector that detects incident light including at least one of diffuse reflected light of the inspection light emitted to the recording medium and fluorescent light excited by the inspection light in the recording medium, the recording medium determination method including:
  making a determination depending on a property of the recording medium based on a detection result of first incident light of the incident light in accordance with first inspection light of the inspection light and second incident light of the incident light in accordance with second inspection light of the inspection light obtained by the light detector,
wherein
  the first inspection light has an intensity whose peak wavelength is more than or equal to 750 nm and less than or equal to 1100 nm, and
  the second inspection light has an intensity whose peak wavelength is shorter than the peak wavelength of the first inspection light.

According to still another aspect of the present invention, a recording medium determination device includes:
  three or more light emitting elements that emit inspection light respectively having specific wavelengths to a recording medium;

a hardware processor that causes the three or more light emitting elements to sequentially emit the inspection light; and a light receiving element that receives light having been emitted from the three or more light emitting elements and passed through the recording medium, wherein the hardware processor determines a type of the recording medium from a relative relationship between an amount of received light concerning a light emitting element used as a reference among the three or more light emitting elements and an amount of received light concerning each of the light emitting elements other than the light emitting element used as the reference, and causes the light emitting element used as the reference to emit the inspection light in a turn other than first and last turns in a sequence of causing the three or more light emitting elements to emit the inspection light.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein:

FIG. 27 is a table in which ranges of ratios of the amounts of reflected light and types of recording media are associated for determining the type of a recording medium;

DETAILED DESCRIPTION OF THE EMBODIMENTS

Hereinafter, embodiments of a recording medium determination device, an image formation device, and a recording medium determination method according to the present invention will be described based on the drawings. However, the scope of the invention is not limited to the disclosed embodiments.

First Embodiment

Figure 1:
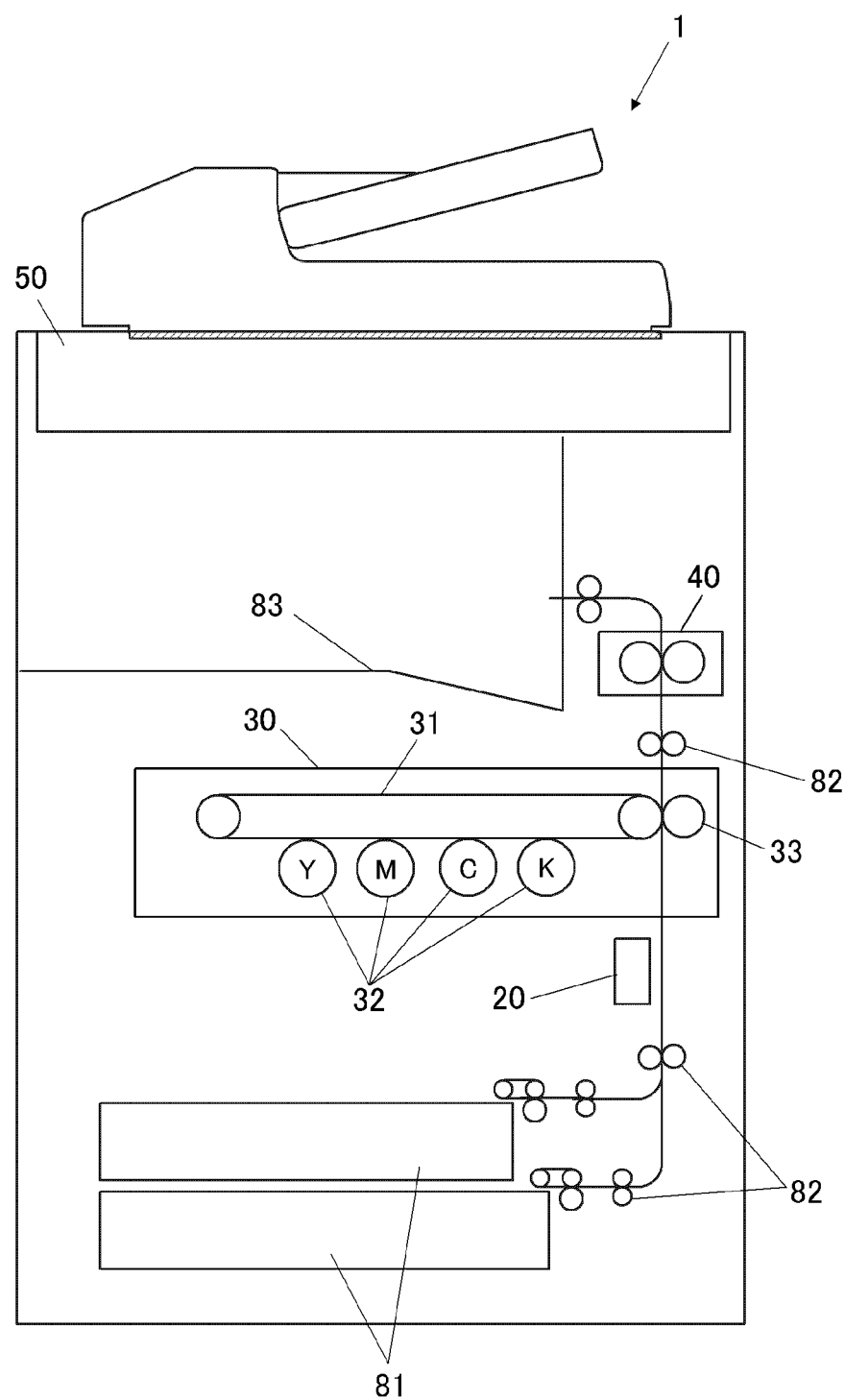
FIG. 1 is a diagram showing a schematic configuration of an image formation device.

Configuration of Image Formation Device and Recording Medium Determination Device FIG. 1 is a diagram showing a schematic configuration of an image formation device 1 which is a first embodiment of the present invention.

Figure 2:
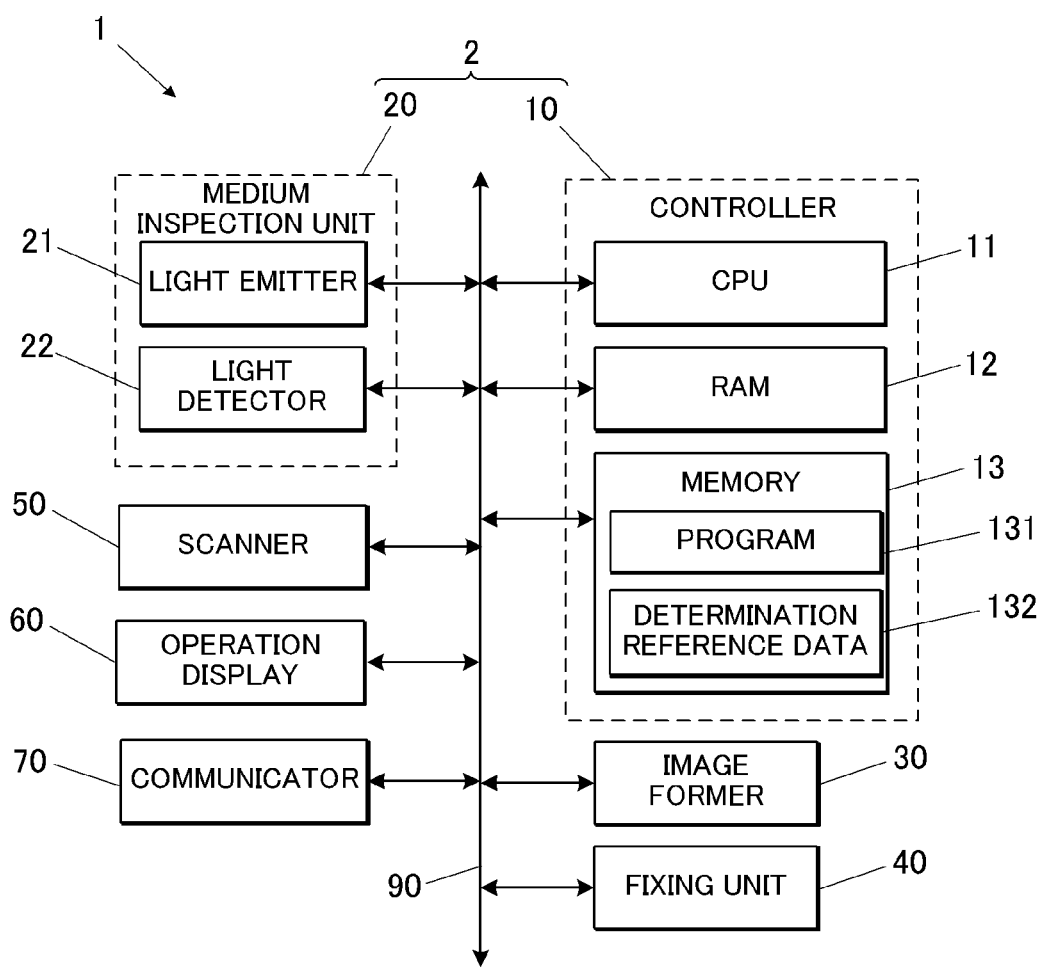
FIG. 2 is a block diagram showing an essential functional configuration of the image formation device.

FIG. 2 is a block diagram showing an essential functional configuration of the image formation device 1.

The image formation device 1 is a multi-function peripheral (MFP) that electrophotographically forms an image on a recording medium. The image formation device 1 includes a controller 10 (hardware processor), a medium inspection unit 20, an image former 30, a fixing unit 40, a scanner 50, an operation display 60, a communicator 70, a paper feed tray 81, a conveyance roller 82, a paper ejection tray 83, a bus 90, and the like. As shown in FIG. 2, the controller 10 and the medium inspection unit 20 constitute a recording medium determination device 2 that determines the class of a recording medium. The respective components of the image formation device 1 are connected with the bus 90.

The controller 10 has a central processing unit (CPU) 11, a random access memory (RAM) 12, and a memory 13.

The CPU 11 reads out and executes a program 131 held in the memory 13 to perform various types of arithmetic processing.

The RAM 12 provides a working memory space for the CPU 11, and holds temporary data.

The memory 13 is a computer-readable non-transitory recording medium. The memory 13 is implemented by a non-volatile memory device such as a hard disk drive (HDD), a solid state drive (SSD), a flash memory, or the like, and stores the program 131 to be executed by the CPU 11, various types of data, and the like. The data held in the memory 13 include image data acquired by the scanner 50, image data externally input through the communicator 70, determination reference data 132 to be referred to in a recording medium determination operation which will be described later, and the like.

When the CPU 11 executes the program 131 held in the memory 13 to perform various types of processing, the controller 10 makes a determination depending on a property of the recording medium based on data acquired from the medium inspection unit 20, and determines the class of the recording medium based on a result of the determination. The determination of the class of the recording medium will be described later.

The controller 10 also integrally controls the respective components of the image formation device 1 when the CPU 11 executes the program 131. For example, the controller 10 operates the respective components of the image former 30, the conveyance roller 82, and the fixing unit 40 based on image data held in the memory 13 to cause an image to be formed on the recording medium. The CPU 11 changes an operation for image formation to be performed by the respective components of the image formation device 1 in accordance with a determination result of the recording medium obtained by the recording medium determination device 2. To cite an example, a conveyance speed and a holding pressure of the conveyance roller 82 are changed in accordance with the class of the recording medium. A temperature and a pressure to be applied by the fixing unit 40 are also changed in accordance with the class of the recording medium.

The medium inspection unit 20 is provided at a position along a conveyance path of the recording medium from the paper feed tray 81 to the paper ejection tray 83 on an upstream side of the image former 30 on the conveyance path. The position of the medium inspection unit 20 is not limited thereto, and may be arranged at any position along the conveyance path. As shown in FIG. 2, the medium inspection unit 20 includes a light emitter 21 and a light detector 22. The light emitter 21 emits inspection light to a recording medium passing through the conveyance path under the control of the controller 10. The light detector 22 detects incident light including at least one of diffuse reflected light of the inspection light emitted to the recording medium and fluorescent light excited by the inspection light in the recording medium. The configuration and operation of the medium inspection unit 20 will be described later.

The image former 30 provides the recording medium supplied from the paper feed tray 81 with toner (a color material) to form an image. The image former 30 includes an intermediate transfer belt 31, image forming units 32, a transfer roller 33, and the like. The intermediate transfer belt 31 is an endless strip-like member hang around a plurality of rollers to move rotationally. The image forming units 32 are arranged along the intermediate transfer belt 31, and form toner images of respective colors of C (cyan), M (magenta), Y (yellow), and K (black) on the intermediate transfer belt 31 based on image data concerning an image targeted for printing. When the recording medium passes through a nip part between the intermediate transfer belt 31 and the transfer roller 33, the toner images are transferred to the recording medium, and an image is formed. Although the image former 30 that forms a color image is illustrated in the present embodiment, this is not a limitation. The image former 30 that forms a monochrome image may be used.

The fixing unit 40 applies heat and pressure to the recording medium to which the toner images have been transferred, thereby fixing the toner images to the recording medium. The fixing unit 40 includes a pair of rollers composed of a heating roller and a pressure roller that sandwich the recording medium. The recording medium to which the toner images have been fixed is conveyed by the conveyance roller 82 and delivered to the paper ejection tray 83. Conditions for applying heat and pressure by the fixing unit 40 are controlled by the controller 10 in accordance with the class of the recording medium or the like.

The scanner 50 includes an optical system such as a light source and a reflecting mirror, and an imaging element, and reads an image on a recording medium conveyed along a predetermined conveyance path or a recording medium placed on a platen glass to generate image data in the bitmap format for each color of R (red), G (green), and B (blue). The generated image data is held in the memory 13. By performing image formation by the image former 30 based on this image data, the read image can also be copied to another recording medium.

The operation display 60 includes a display device such as a liquid crystal display, a touch panel arranged in a manner overlapping a screen of the display device, and an input device such as operation keys. The operation display 60 provides, on the display device, various displays such as an operation status and a processing result of the image formation device 1, and converts a user's input operation on the input device into an operation signal for output to the controller 10.

The communicator 70 is implemented by a network card or the like. The communicator 70 is connected to a communication network such as a local area network (LAN), and transmits/receives information to/from external equipment on the communication network. The controller 10 communicates with the external equipment on the communication network via the communicator 70.

A recording medium prior to image formation is stored in the paper feed tray 81. A plurality of classes (types) of recording media may be stored in the paper feed tray 81. The class of a recording medium is characterized by at least one property among the material (raw material) of the recording medium, the state of surface treatment, the presence/absence and amount of a fluorescent whitening agent, whether bluing has been performed, and the color. Thus, recording media different from each other in at least one of these properties are recording media of different classes. Recording media to be stored in the paper feed tray 81 are plain paper, coated paper, wood containing paper, recycled paper, and the like, for example, which exemplify the recording media of different classes. Plain paper is paper produced using pulp made of wood (that is, pulp not recycled from used paper; usually, chemical pulp) as a main raw material. Coated paper is paper whose surface is coated with a coating material or the like. Wood containing paper is paper produced using mechanical pulp, for example, as a main raw material. Recycled paper is paper in which used paper pulp taken out from used paper has been blended at a blending ratio of more than or equal to a predetermined value. The classes of recording media to be stored in the paper feed tray 81 are not limited to those described above.

The conveyance roller 82 rotates in a state sandwiching a single recording medium to convey the recording medium along the conveyance path. The conveyance timing and conveyance speed of the conveyance roller 82 are controlled by the controller 10 in accordance with the class of the recording medium or the like.

A recording medium on which an image has been formed is placed on the paper ejection tray 83 until being taken out by a user.

Configuration of Medium Inspection Unit

A configuration of the medium inspection unit 20 will now be described.

Figure 3A:
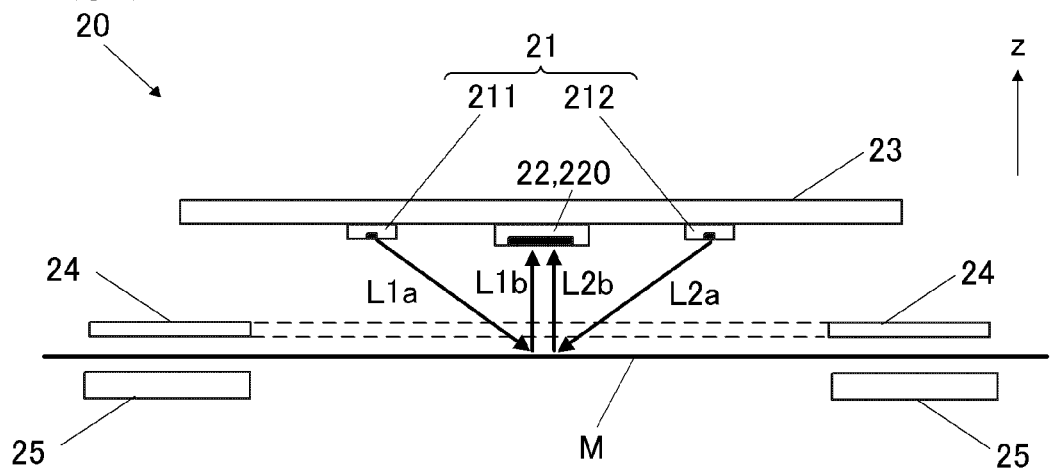
FIG. 3A is a diagram showing a configuration of a medium inspection unit.
Figure 3B:
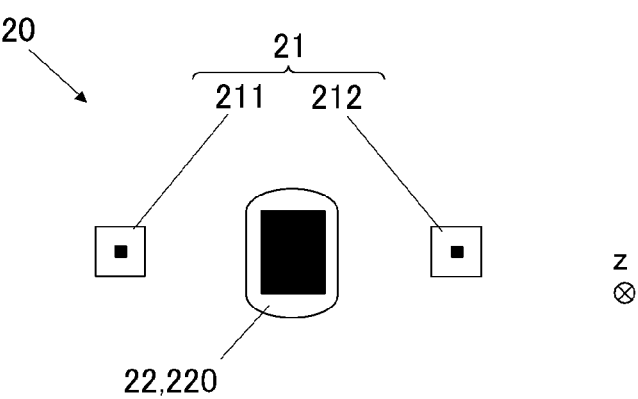
FIG. 3B is a diagram showing the configuration of the medium inspection unit.

FIG. 3A and FIG. 3B are diagrams showing the configuration of the medium inspection unit 20.

FIG. 3A is a cross-sectional view of the medium inspection unit 20 as seen in a direction parallel to a conveyance path (conveyance plane) of a recording medium M. FIG. 3B is a plan view of the medium inspection unit 20 as seen in a direction (z direction) vertical to the conveyance plane. The medium inspection unit 20 includes an element substrate 23 (substrate) provided at a position opposite to the conveyance plane of the conveyance path of the recording medium M (in other words, at a position opposite to the recording medium M passing through the conveyance path), a paper passage guide 25 that supports the recording medium M such that the recording medium M moves along the conveyance path, an optical diaphragm 24 provided on the opposite side of the paper passage guide 25 with the recording medium M interposed therebetween, and the like.

The element substrate 23 is arranged vertically to the z direction. On a surface of the element substrate 23 opposite to the recording medium M, a first light emitting element 211 and a second light emitting element 212 that the light emitter 21 has, and a light receiving element 220 that the light detector 22 has are provided. The first light emitting element 211 emits first inspection light L1$a$ to the recording medium M. The second light emitting element 212 emits second inspection light L2$a$ to the recording medium M. The light detector 22 has the single light receiving element 220. The light receiving element 220 outputs a photocurrent in accordance with an amount of incident light. The light detector 22 converts this photocurrent into a voltage and then into digital data, and outputs the digital data to the controller 10. As shown in FIG. 3A and FIG. 3B, the light receiving element 220 is arranged between the first light emitting element 211 and the second light emitting element 212. The distance from the first light emitting element 211 to the light receiving element 220 and the distance from the second light emitting element 212 to the light receiving element 220 are preferably equal.

The optical diaphragm 24 is a plate-like member arranged vertically to the z direction, and has an aperture in a range including a portion opposite to the first light emitting element 211, the second light emitting element 212, and the light receiving element 220. The first inspection light L1$a$ and the second inspection light L2$a$ pass through this aperture to enter the recording medium M. A portion other than the aperture of the optical diaphragm 24 has a light blocking effect, and prevents light other than the inspection light from entering the recording medium M.

The recording medium M is conveyed through a gap between the optical diaphragm 24 and the paper passage guide 25. Since the gap has a width in the z direction, the position at which the recording medium M passes may vary in the z direction within the range of the width. In accordance with variation in the position at which the recording medium M passes, the distances from the first light emitting element 211, the second light emitting element 212, and the light receiving element 220 to the recording medium M also vary. However, since the first light emitting element 211, the second light emitting element 212, and the light receiving element 220 are provided on the same surface of the element substrate 23, an influence exerted by the variation on an inspection result obtained by the medium inspection unit 20 is minimized.

Figure 4:
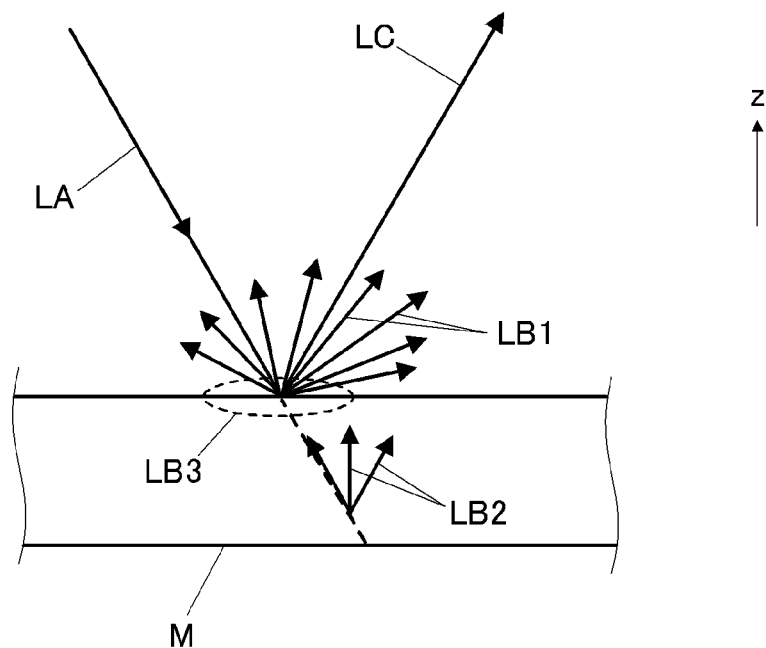
FIG. 4 is a diagram describing light targeted for detection by the medium inspection unit.

FIG. 4 is a diagram describing light targeted for detection by the medium inspection unit 20.

Inspection light LA (the first inspection light L1a or the second inspection light L2a described above) emitted from the light emitter 21 enters the surface of the recording medium M. Reflected light of this inspection light LA from the recording medium M includes surface diffuse reflected light LB1 and specular reflected light LC. Part of the inspection light LA having entered the recording medium M is diffusely reflected in a direction having a z-direction component as internal diffuse reflected light LB2. In the present specification, the surface diffuse reflected light LB1 and the internal diffuse reflected light LB2 will be collectively referred to as "diffuse reflected light". In a case in which a fluorescent whitening agent has been added to the recording medium M, fluorescent light LB3 is excited at the recording medium M depending on the wavelength of the inspection light LA. The light detector 22 (the light receiving element 220) of the present embodiment detects the surface diffuse reflected light LB1, the internal diffuse reflected light LB2, and the fluorescent light LB3. Hereinafter, light that enters the light receiving element 220 of the light detector 22 in accordance with emission of the first inspection light L1a will be referred to as "first incident light L1b", and light that enters the light receiving element 220 of the light detector 22 in accordance with emission of the second inspection light L2a will be referred to as "second incident light L2b" (see FIG. 3A). The light receiving element 220 is provided at a position at which the specular reflected light LC of the inspection light LA emitted in a main light emitting direction (a direction in which the light emission intensity is the highest) of the first light emitting element 211 and the second light emitting element 212 is not received. Instead of the configuration in which the single light receiving element 220 is provided, a light receiving element that detects the first incident light L1b and a light receiving element that detects the second incident light L2b may be provided separately.

Figure 5:
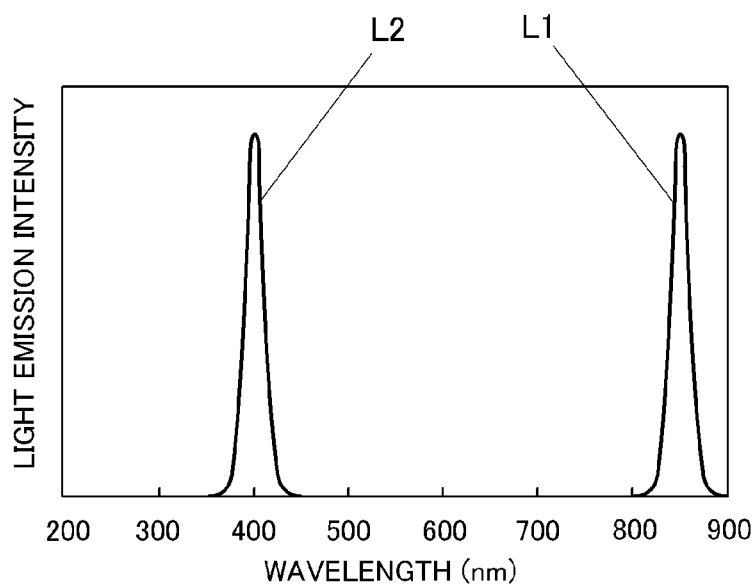
FIG. 5 is a diagram showing an example of emission spectra of a first light emitting element and a second light emitting element.

FIG. 5 is a diagram showing an example of emission spectra of the first light emitting element 211 and the second light emitting element 212.

The first inspection light L1a emitted from the first light emitting element 211 has an intensity whose peak wavelength (central wavelength) is more than or equal to 750 nm and less than or equal to 1100 nm. More preferably, the first inspection light L1a has an intensity whose peak wavelength is more than or equal to 800 nm and less than or equal to 900 nm. The second inspection light L2a emitted from the second light emitting element 212 has an intensity whose peak wavelength is shorter than the peak wavelength of the first inspection light L1a. The peak wavelength of the second inspection light L2a is set in accordance with an object of an inspection as will be described later. FIG. 5 illustrates a case in which the first inspection light L1a has an intensity whose peak wavelength is 850 nm, and the second inspection light L2a has an intensity whose peak wavelength is 400 nm. The half widths of the emission spectra of the first light emitting element 211 and the second light emitting element 212 are set at about 20 to 30 nm, for example, but this is not a limitation. A light emitting diode (LED) or a laser diode (LD), for example, is used for the first light emitting element 211 and the second light emitting element 212, but this is not a limitation.

Figure 6:
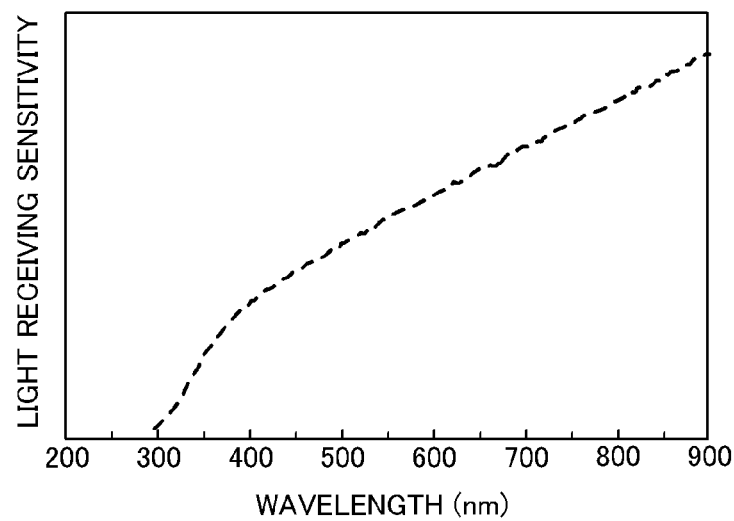
FIG. 6 is a diagram showing an example of a spectral sensitivity property of a light receiving element.

FIG. 6 is a diagram showing an example of a spectral sensitivity property of the light receiving element 220.

As shown in FIG. 6, the light receiving element 220 of the light detector 22 has a detection sensitivity (light receiving sensitivity) in a wavelength region from the visible wavelength region to the near-infrared wavelength region. The visible wavelength region is approximately more than or equal to 380 nm and less than or equal to 780 nm. The near-infrared wavelength region is approximately more than or equal to 780 nm and less than or equal to 2500 nm. A photodiode or a phototransistor is used as the light receiving element 220. In particular, a Si (silicon) photodiode, a Si phototransistor, a Ge (germanium) photodiode, and a Ge phototransistor having detection sensitivities in the wavelength region from the visible wavelength region to the near-infrared wavelength region are suitably used. These photodiodes and phototransistors have a spectral sensitivity property in which the light receiving sensitivity is higher as the wavelength is longer in the visible wavelength region and the near-infrared wavelength region, as shown in FIG. 6. Thus, fluorescent light (a blue region in the visible wavelength region) is higher in light receiving sensitivity than fluorescence excitation light (in the ultraviolet wavelength region), and is thus suitably used for determining the presence/absence and amount of a fluorescent whitening agent as will be described later. In particular, in a case of using boro silicate glass or coating resin, the light receiving sensitivity in the ultraviolet wavelength region is lower, and thus the accuracy of determining fluorescent light is higher than in a case of using quartz for a window of the light receiving element 220. An element other than a photodiode and a phototransistor may be used as the light receiving element 220.

By correcting the light emission intensity of each of the first light emitting element 211 and the second light emitting element 212 before inspecting the recording medium M, the reflectance at the recording medium M is calculated from the amount of light received by the light receiving element 220. In other words, a predetermined correction-purpose reflective member is first arranged in an emission range of the first inspection light L1a (the second inspection light L2a) from the first light emitting element 211 (the second light emitting element 212), and the amount of reflected light from the reflective member received by the light detector 22 is detected. A standard white plate, predetermined paper, a predetermined sheet, or the like is used as the correction-purpose reflective member. The recording medium M targeted for inspection is then conveyed to the position of the medium inspection unit 20, and the first inspection light L1a (the second inspection light L2a) is emitted to the recording medium M from the first light emitting element 211 (the second light emitting element 212) to detect the amount of the first incident light L1b (the second incident light L2b) received by the light detector 22. From these results of detection, the reflectance R1 (the reflectance R2) is calculated. In the present specification, the reflectance shall be defined as "the received amount of incident light when inspection light is emitted to the recording medium M divided by the received amount of reflected light when inspection light is emitted to the correction-purpose reflective member". Therefore, in a case in which fluorescent light is excited in the recording medium M, the received amount of fluorescent light is reflected in the reflectance in addition to the received amount of diffuse reflected light. The reflectance R1 calculated from the amount of the first incident light L1b received by the light detector 22 is one mode of a "first value". The reflectance R2 calculated from the amount of the second incident light L2*b* received by the light detector 22 is one mode of a "second value".

The first light emitting element 211 and the second light emitting element 212 alternately emit light in sequence under the control of the controller 10. In other words, a period in which the first light emitting element 211 emits the first inspection light L1*a* to the recording medium M is different from a period in which the second light emitting element 212 emits the second inspection light L2*a* to the recording medium M. The light detector 22 alternately detects in sequence the first incident light L1*b* in accordance with emission of the first inspection light L1*a* and the second incident light L2*b* in accordance with emission of the second inspection light L2*a*. In other words, the medium inspection unit 20 of the present embodiment performs time division measurement. The periods in which the first light emitting element 211 and the second light emitting element 212 emit light may partially overlap. In this case, the first incident light L1*b* is detected in a period in which only the first light emitting element 211 emits light, and the second incident light L2*b* is detected in a period in which only the second light emitting element 212 emits light.

Operations of Image Formation Device and Recording Medium Determination Device

Operations of the image formation device 1 and the recording medium determination device 2 will now be described mainly concerning an operation for determining the class of a recording medium.

Optimum conveying and fixing conditions for a recording medium in the image formation device 1 are different depending on the class of the recording medium. The class of the recording medium to be conveyed may be set in accordance with a user's operation on the operation display 60. However, setting the class each time is burdensome, and a problem of erroneous setting may also arise. Thus, in the image formation device 1 of the present embodiment, the class of a recording medium is determined by the recording medium determination device 2. Specifically, the class of the recording medium is determined based on a determination result of the following properties (i) to (iv) of the recording medium:

(i) material of the recording medium;
(ii) whether bluing has been performed;
(iii) presence/absence and amount of a fluorescent whitening agent; and
(iv) color of the recording medium.

When emitting inspection light to the recording medium and detecting light at a position at which diffuse reflected light of the inspection light is received, an influence of a property of the recording medium appears in a reflection spectrum particularly in the ultraviolet wavelength region and the visible wavelength region. In the present specification, the reflection spectrum shall be obtained by adding the spectrum of the diffuse reflected light and the spectrum of fluorescent light. Hereinafter, an influence on the reflection spectrum exerted by the above properties (i) to (iv) of the recording medium will be described first.

(i) Material of Recording Medium

Figure 7:
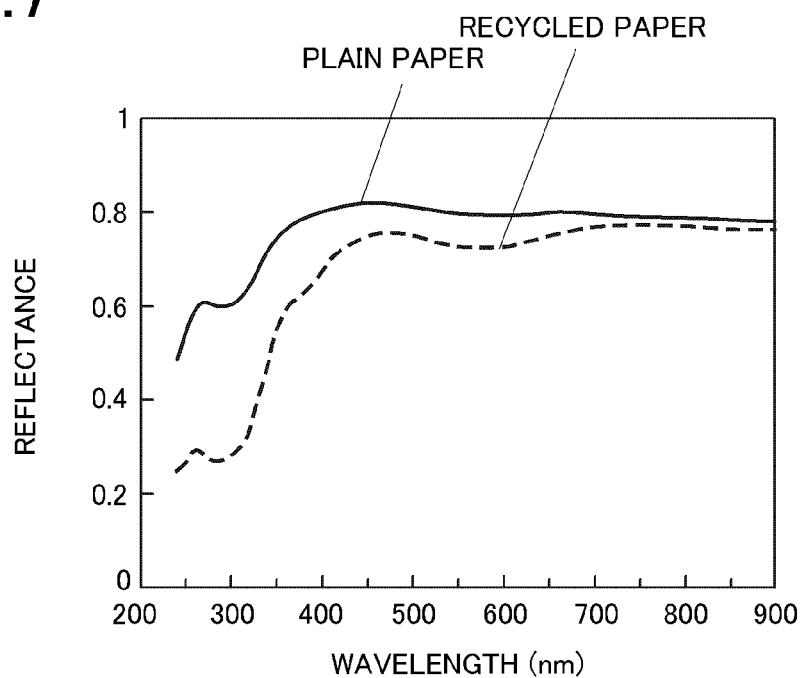
FIG. 7 is a diagram showing an example of reflection spectra of plain paper and recycled paper.

On a shorter wavelength side than the near-infrared wavelength region, that is, in the visible wavelength region and the ultraviolet wavelength region, the reflection spectrum is influenced by the material (raw material) of the recording medium in many wavelength regions. Recycled paper that contains a large amount of used paper pulp, for example, absorbs light because of impurities. Thus, as shown in FIG. 7, the reflectance is lower than that of plain paper in the ultraviolet wavelength region and the visible wavelength region. Wood containing paper that contains a large amount of mechanical pulp absorbs light because of pulp and lignin. Thus, the reflectance is similarly lower than that of plain paper in the ultraviolet wavelength region and the visible wavelength region. Thus, by acquiring the reflectance using inspection light in a wavelength region in which the reflectance is reduced, the recording medium is determined based on a difference in material between recording media.

(ii) Whether Bluing has been Performed

Figure 8:
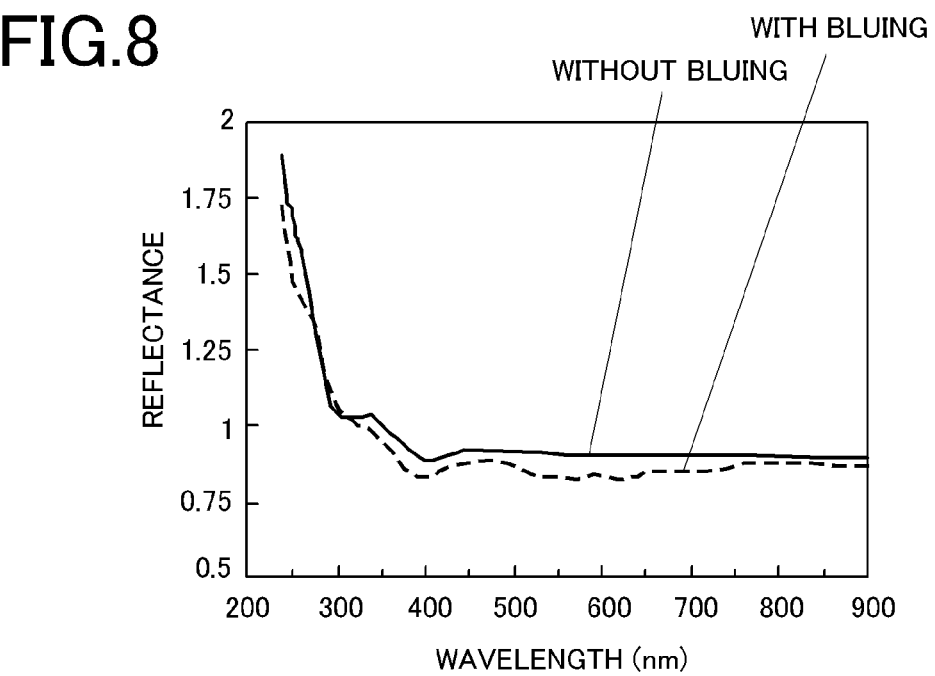
FIG. 8 is a diagram showing an example of a difference between reflection spectra depending on whether bluing has been performed.

A step called "bluing" of adding a blue dye to a recording medium to improve whiteness is performed in some cases. The recording medium having been subjected to bluing has absorption in a wavelength region from green to red (approximately 500 to 750 nm) because of the dye, and the reflectance in a blue wavelength region becomes relatively larger, as shown in FIG. 8. Thus, by acquiring the reflectance using inspection light in the wavelength region in which absorption occurs, the recording medium is determined based on whether bluing has been performed.

(iii) Presence/Absence and Amount of Fluorescent Whitening Agent

Figure 9:
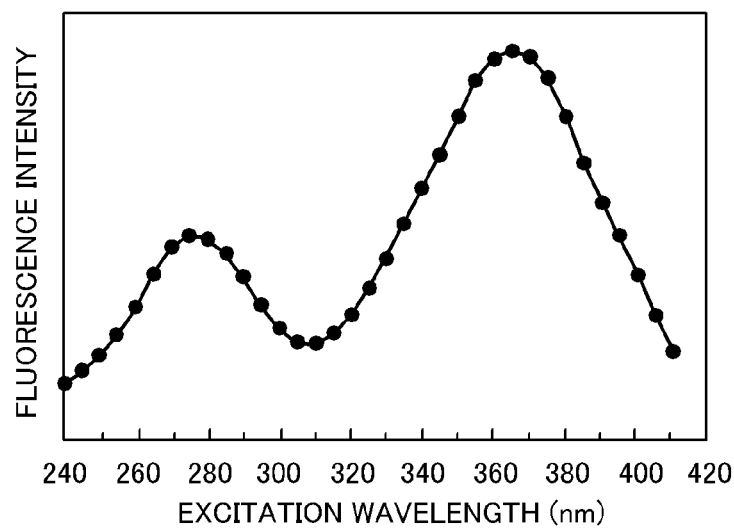
FIG. 9 is a diagram showing an example of a relationship between the wavelength that excites fluorescent light in a recording medium to which a fluorescent whitening agent has been added and the intensity of excited fluorescent light.
Figure 10:
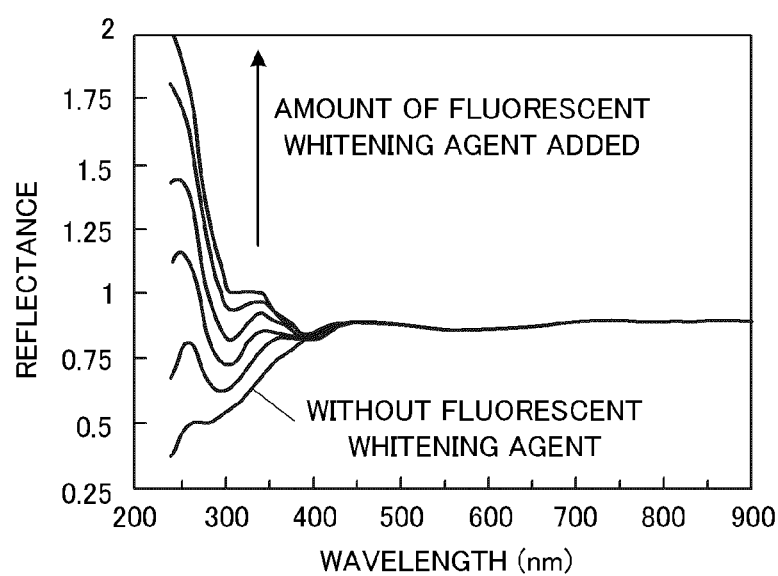
FIG. 10 is a diagram showing an example of differences between reflection spectra depending on the amount of the fluorescent whitening agent added.

A step called "fluorescent whitening" of adding a fluorescent whitening agent to a recording medium to improve whiteness of the recording medium is performed in some cases. The fluorescent whitening agent mainly absorbs excitation light in the ultraviolet wavelength region, and emits fluorescent light in the blue wavelength region. FIG. 9 is a diagram showing an example of a relationship between the wavelength at which fluorescent light is excited in a recording medium to which the fluorescent whitening agent has been added and the intensity of excited fluorescent light. As shown in FIG. 9, excitation light in the ultraviolet wavelength region is absorbed, and blue fluorescent light on the longer wavelength side occurs. As a result, as shown in FIG. 10, apparent reflectance in the ultraviolet wavelength region and the visible (blue) wavelength region increases because of fluorescent light. As the amount of the fluorescent whitening agent added is larger, the reflectance significantly increases. Thus, by acquiring the reflectance using inspection light in the wavelength region in which fluorescent light occurs, the recording medium is determined based on the presence/absence and amount of the fluorescent whitening agent.

(iv) Color of Recording Medium

Figure 11:
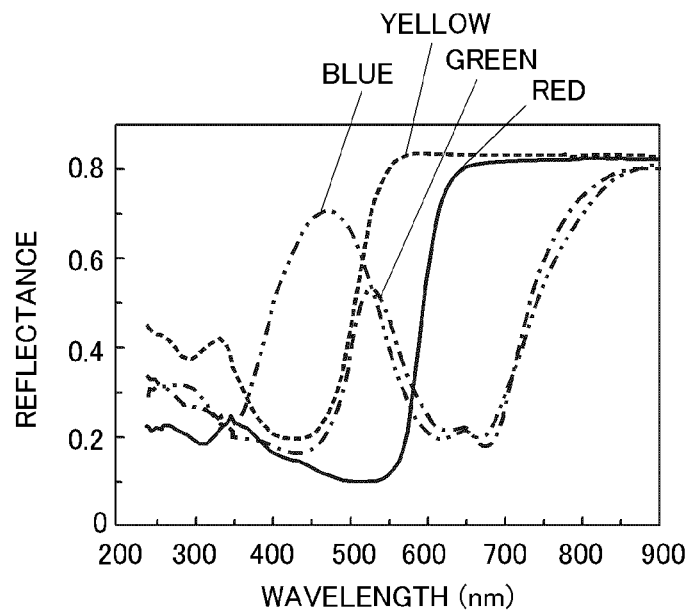
FIG. 11 is a diagram showing an example of differences between reflection spectra depending on the color of colored paper.

Colored paper colored by a dye (coloring material) has absorption in a specific wavelength region in accordance with the color of the dye. As a result, as shown in FIG. 11, the reflectance in the wavelength region corresponding to the color of the colored paper relatively increases, and a desired color is presented. Thus, by acquiring the reflectance using inspection light in the wavelength region in which absorption occurs because of the dye, the recording medium is determined based on a difference in color.

In this manner, influences of various properties of the recording medium appear particularly in the visible wavelength region and the ultraviolet wavelength region in the reflection spectrum. Thus, by emitting inspection light in a wavelength region in which the influence of a property targeted for determination appears to the recording medium, the property of the recording medium is determined based on the received amount of reflected light and fluorescent light to specify the class of the recording medium.

Figure 12:
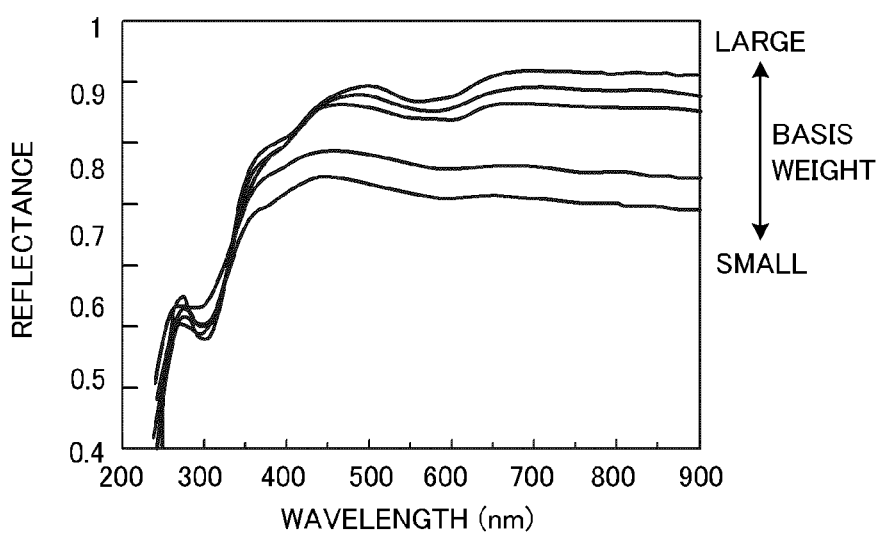
FIG. 12 is a diagram showing an example of amounts of reflected light in accordance with the basis weight.

However, when a determination is made depending on a property of the recording medium with inspection light in a wavelength region, it is difficult to make a correct determination depending on the property of the recording medium in a case in which the amount of received light varies due to a factor other than the property targeted for determination. As shown in FIG. 12, for example, the reflected amount of inspection light varies in accordance with the basis weight of the recording medium. In a case in which the basis weight of the recording medium targeted for determination is unknown, variation in the amount of reflected light resulting from this basis weight and variation in the amount of received light resulting from a property of the recording medium are not distinguishable. Thus, the method of using inspection light in one wavelength region makes it difficult to make a correct determination depending on a property of the recording medium, and an erroneous determination depending on the class of the recording medium is likely to occur.

On the other hand, as shown in FIGS. 7, 8, 10, and 11, variation in the reflection spectrum resulting from a property of the recording medium hardly occurs in the near-infrared wavelength region.

Therefore, the recording medium determination device 2 of the present embodiment uses the first inspection light in the near-infrared wavelength region in which there is little variation resulting from a property of the recording medium and the second inspection light in a wavelength region in which the influence exerted by a property of the recording medium appears, thereby making a determination depending on a property of the recording medium considering wavelength dependency in the two wavelength regions. In other words, variation due to a factor other than the property of the recording medium in the amount of received light of the second incident light L2b in accordance with the second inspection light L2a is deducted (offset) based on the amount of received light of the first incident light L1b in accordance with the first inspection light L1a.

As described above, the peak wavelength of the intensity of the first inspection light L1a is set at more than or equal to 750 nm and less than or equal to 1100 nm. By setting the upper limit at 1100 nm, variation in the amount of received light resulting from water contained in the recording medium is reduced. This is because water has an inherent absorption band derived from the bond vibration including stretching vibration and bending vibration between a hydrogen atom and an oxygen atom in a range in the neighborhood of 1450 nm and 1940 nm. By setting the peak wavelength of the intensity of the first inspection light L1a at more than or equal to 800 nm and less than or equal to 900 nm, the influence of a property of the recording medium is reduced further.

Examples of a method of determining the property of the recording medium based on a detection result of the first incident light L1b and the second incident light L2b include a method of making a determination based on a ratio (hereinafter referred to as a reflectance ratio R2/R1) between the reflectance R1 calculated from the amount of received light of the first incident light L1b and the reflectance R2 calculated from the amount of received light of the second incident light L2b. For example, even if the amount of reflected light varies due to a difference in the basis weight, this variation is offset by taking the reflectance ratio R2/R1. Thus, the influence of a property of the recording medium excluding the influence of the basis weight appears in the reflectance ratio R2/R1. The use of the reflectance ratio R2/R1 enables the property of the recording medium to be determined appropriately, and the class of the recording medium to be specified correctly.

Hereinafter, a method of determining the above properties (i) to (iv) of the recording medium in the recording medium determination device 2 will be described.

Example 1: Determination Depending on Material of Recording Medium

First, as Example 1, a method of determining the class (paper quality) of a recording medium based on absorption of inspection light because of the material of the recording medium will be described.

In Example 1, light having an intensity whose peak wavelength is more than or equal to 390 nm and less than or equal to 440 nm is used as the second inspection light L2a. This is because absorption resulting from the material of the recording medium is likely to appear in this wavelength region as shown in FIG. 7. By setting the lower limit at 390 nm, an essential excitation wavelength of fluorescent light shown in FIG. 9 is excluded. Thus, even in a case in which a fluorescent whitening agent has been added to the recording medium, contribution of fluorescent light is reduced. This enables a determination depending on the material to be made with high accuracy. As shown in FIG. 6, the light receiving element 220 having a spectral sensitivity property in which the light receiving sensitivity is higher as the wavelength is longer in the visible wavelength region and the near-infrared wavelength region is used. This reduces contribution of fluorescent light, and enables the determination depending on the material to be made with high accuracy. The use of a light receiving element not having a sensitivity in the ultraviolet wavelength region further increases the accuracy of determination.

Next, recording medium determination processing to be executed by the controller 10 of the recording medium determination device 2 in Example 1 will be described. Herein, a description will be provided citing, as an example, a case of determining whether a recording medium is plain paper or coated paper, or recycled paper or wood containing paper in a case in which the recording medium is white paper. This method enables the recording medium being conveyed to be determined as either plain paper or wood containing paper in a case in which, for example, plain paper and wood containing paper are stored in the paper feed tray 81 of the image formation device 1.

Figure 13:
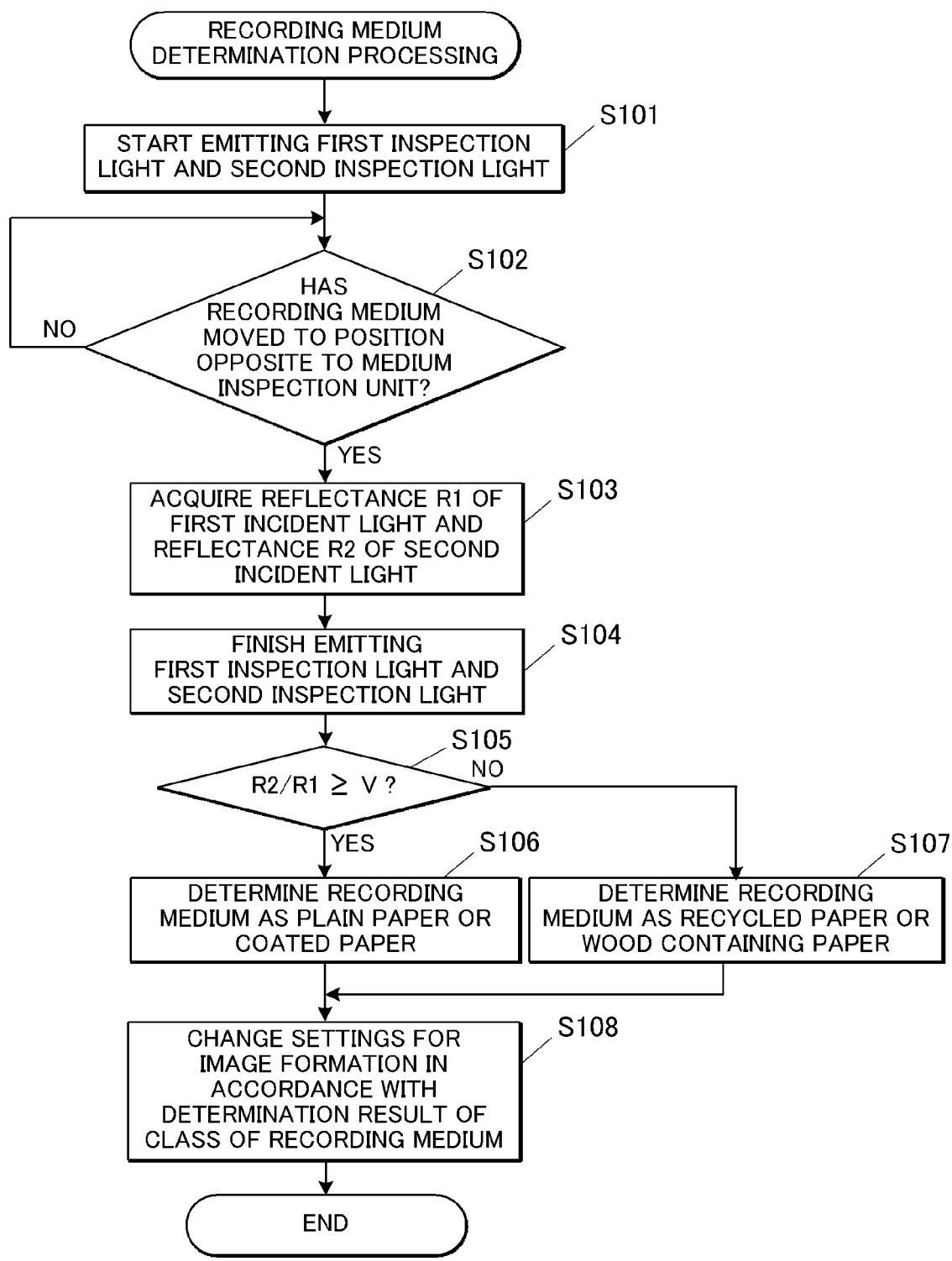
FIG. 13 is a flowchart showing a control procedure of recording medium determination processing.

FIG. 13 is a flowchart showing a control procedure of the recording medium determination processing.

When the recording medium determination processing is started, the controller 10 causes the first light emitting element 211 to start emitting the first inspection light, and causes the second light emitting element 212 to start emitting the second inspection light (step S101). Herein, the controller 10 causes the first light emitting element 211 and the second light emitting element 212 to emit light (for example, alternately) such that the period in which the first light emitting element 211 emits light and the period in which the second light emitting element 212 emits light are different from each other.

The controller 10 determines whether the recording medium has moved to a position opposite to the medium inspection unit 20 based on an output signal from a sensor not shown (step S102), and in a case of determining that the recording medium has not moved ("NO" in step S102), executes the processing of step S102 again. In a case of determining that the recording medium has moved to the position opposite to the medium inspection unit 20 ("YES" in step S102), the controller 10 acquires the amount of the first incident light L1b received by the light receiving element 220, and calculates the reflectance R1 of the first inspection light L1a. The controller 10 also acquires the amount of the second incident light L2b received by the light receiving element 220, and calculates the reflectance R2 of the second inspection light L2a (step S103). Describing in detail, the controller 10 calculates the reflectance R1 from the amount of light received by the light receiving element 220 when the first inspection light L1a is emitted to the recording medium, and calculates the reflectance R2 from the amount of light received by the light receiving element 220 when the second inspection light L2a is emitted to the recording medium.

The controller 10 terminates emission of the first inspection light L1a and the second inspection light L2a (step S104).

The controller 10 determines whether the reflectance ratio R2/R1 is more than or equal to the reference value V (step S105). The reference value V is set in accordance with a property targeted for determination, and is held in the memory 13 as the determination reference data 132. In the present example, the reference value V shall be 0.88.

In a case of determining that the reflectance ratio R2/R1 is more than or equal to the reference value V ("YES" in step S105), the controller 10 determines the recording medium as plain paper or coated paper (step S106). In a case of determining that the reflectance ratio R2/R1 is less than the reference value V ("NO" in step S105), the controller 10 determines the recording medium as recycled paper or wood containing paper (step S107).

When step S106 or S107 is finished, the controller 10 changes settings for image formation in accordance with a determination result of the class of the recording medium (step S108), and finishes the recording medium determination processing. In a case of subsequently inspecting another recording medium, the process may be returned to step S101 after step S108 is finished.

The determination method in steps S103 to S106 will be described in detail.

Figure 14:
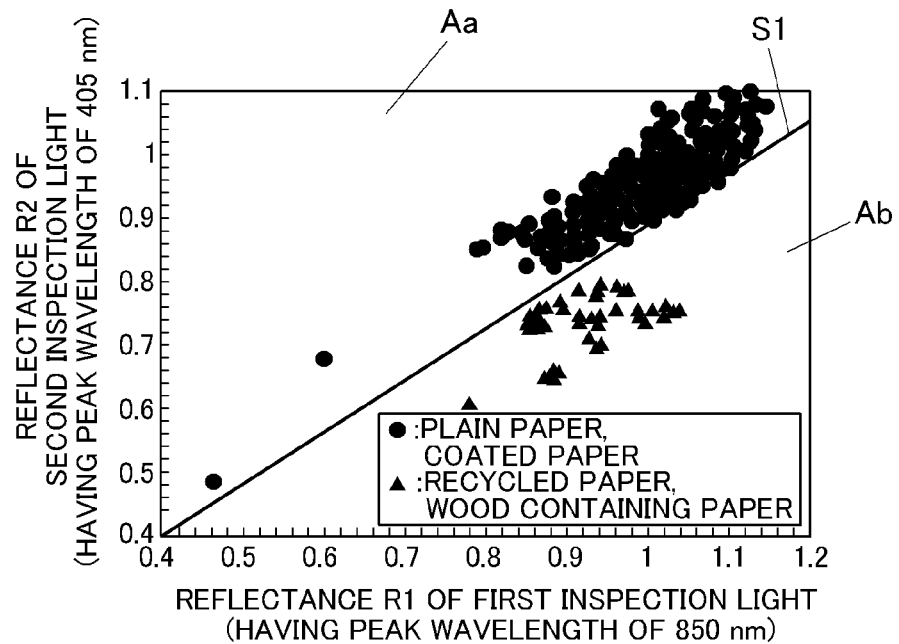
FIG. 14 is a diagram showing an example of distributions of reflectance R1 of first inspection light and reflectance R2 of second inspection light on plain paper, coated paper, recycled paper, and wood containing paper.

FIG. 14 is a diagram showing an example of distributions of the reflectance R1 of the first inspection light L1a and the reflectance R2 of the second inspection light L2a on plain paper, coated paper, recycled paper, and wood containing paper. Describing in detail, the reflectance R1 of the first inspection light L1a having a peak wavelength of 850 nm and the reflectance R2 of the second inspection light L2a having a peak wavelength of 405 nm are acquired and plotted for plain paper, coated paper, recycled paper, and wood containing paper.

A reference line S1 in FIG. 14 is a line equivalent to a reflectance ratio expressed as: R2/R1=0.88. In other words, the reference line S1 is a linear function (proportional expression) that passes through the origin and has an inclination of the reference value V. A coordinate plane obtained by using the reflectances R1 and R2 as two axes is separated into two regions Aa and Ab by the reference line S1. The region Aa corresponds to a reflectance ratio expressed as: R2/R1≥V, and the region Ab corresponds to a reflectance ratio expressed as: R2/R1<V. Plots of plain paper and coated paper are distributed in the region Aa, and plots of recycled paper and wood containing paper are distributed in the region Ab. This enables the recording medium to be determined as plain paper or coated paper in a case in which the detection result of the amount of incident light when any recording medium is inspected by the medium inspection unit 20 satisfies the reflectance ratio expressed as: R2/R1≥V (in a case of being included in the region Aa), and enables the recording medium to be determined as recycled paper or wood containing paper in a case in which the detection result satisfies the reflectance ratio expressed as: R2/R1<V (in a case of being included in the region Ab).

By such a method, even if there is a factor that causes the reflectances R1 and R2 to vary other than a property of the recording medium as described above, the influence exerted by the factor is offset, and the property of the recording medium is correctly determined. For example, in data of FIG. 14, the reflectances R1 and R2 vary due to differences in basis weight between recording media. This is determined because the reflectance R1 of the first inspection light L1a supposed to hardly vary due to a property of the recording medium varies (the reflectance R1=0.46 to 1.15 on plain paper and coated paper, and the reflectance R1=0.78 to 1.05 on recycled paper and wood containing paper). Under the influence that the variation in reflectance due to differences in basis weight is also reflected in the reflectance R2 of the second inspection light L2a, a distribution range (0.48 to 1.1) of the reflectance R2 of plain paper and coated paper and a distribution range (0.6 to 0.8) of the reflectance R2 of recycled paper and wood containing paper partially overlap. Thus, when only the reflectance R2 of the second inspection light L2a is used, the paper quality of the recording medium is not determined correctly. In contrast, by using the reflectance ratio R2/R1 between the first inspection light L1a and the second inspection light L2a as in the present embodiment, a determination is made considering wavelength dependency in two wavelength regions. In other words, by using not only the reflectance R2 on the vertical axis in FIG. 14 but also the ratio to the reflectance R1 on the horizontal axis, a factor other than the material of the recording medium is offset.

In FIG. 14, the proportional expression in which the inclination has the reference value V is used as the reference line S1, but this is not a limitation. The reference line S1 may be any line not parallel to two axes on the coordinate plane obtained by using the reflectances R1 and R2 as the two axes. In other words, the reference line S1 may be expressed as: R2=a·R1+b where a and b are any constants (a≠0). In this case, in a case in which the relation: R2≥a·R1+b is satisfied in step S104, the process proceeds into step S105. In a case in which the relation: R2≥a≠R1+b is not satisfied, the process proceeds into step S106. The constants a and b are previously set, and held in the memory 13 as the determination reference data 132.

The coordinate plane may be separated into three or more regions by two or more reference lines, and the recording medium may be determined based on a region among these regions that includes coordinates corresponding to a detection result of the amount of incident light when the recording medium is inspected by the medium inspection unit 20.

The above-described method enables recycled wood-free paper of recycled paper to be suitably determined. Recycled wood-free paper is paper that contains used paper pulp at a blending ratio of more than or equal to 70% and having whiteness of less than or equal to 75. This is because paper having a small blending ratio of used paper pulp (for example, approximately several tens of percentage) is less influenced by absorption because of impurities in pulp, and even paper indicated as having a blending ratio of used paper pulp of 100% has paper physical properties close to those of plain paper and wood-free paper in a case in which whiteness is increased using pulp whitening, a loading material, or a chemical such as a fluorescent whitening agent.

Example 2: Determination Depending on Whether Bluing has been Performed

Whether bluing has been performed is determined similarly to Example 1. In this case, the reference line S1 is set in FIG. 14 such that recording media having subjected to bluing belong to the region Aa, and recording media not having subjected to bluing belong to the region Ab.

Example 3: Determination Depending on Presence/Absence and Amount of Fluorescent Whitening Agent As Example 3, a method of determining the presence/absence and amount of a fluorescent whitening agent will now be described.

In Example 3, light having an intensity whose peak wavelength is more than or equal to 280 nm and less than or equal to 400 nm is used as the second inspection light L2a. A fluorescent whitening agent commonly used for recording media has many molecules having a conjugate double bond to form a planar structure, such as a stilbenzene-based, distyryl-biphenyl-based, coumarin-based, or oxazole-based agent. These materials absorb ultraviolet light of about 280 nm to about 400 nm to transition to an excited state, and when relieved again to a ground state, emit blue fluorescent light of about 400 nm to about 500 nm. Thus, in Example 3, the wavelength region of the second inspection light L2a and the wavelength region of the second incident light L2b (mainly, fluorescent light) in accordance with the second inspection light L2a are different. Since the use of the second inspection light L2a in the above-described wavelength region enables fluorescent light to be detected, the presence/absence and amount of a fluorescent whitening agent are determined with high accuracy. As shown in FIG. 6, by using the light receiving element 220 having a spectral sensitivity property in which the light receiving sensitivity is higher as the wavelength is longer in the visible wavelength region and the near-infrared wavelength region, contribution of reflected light of excitation light (the second inspection light L2a) is reduced, and fluorescent light (the second incident light L2b) is detected with high accuracy.

Figure 15:
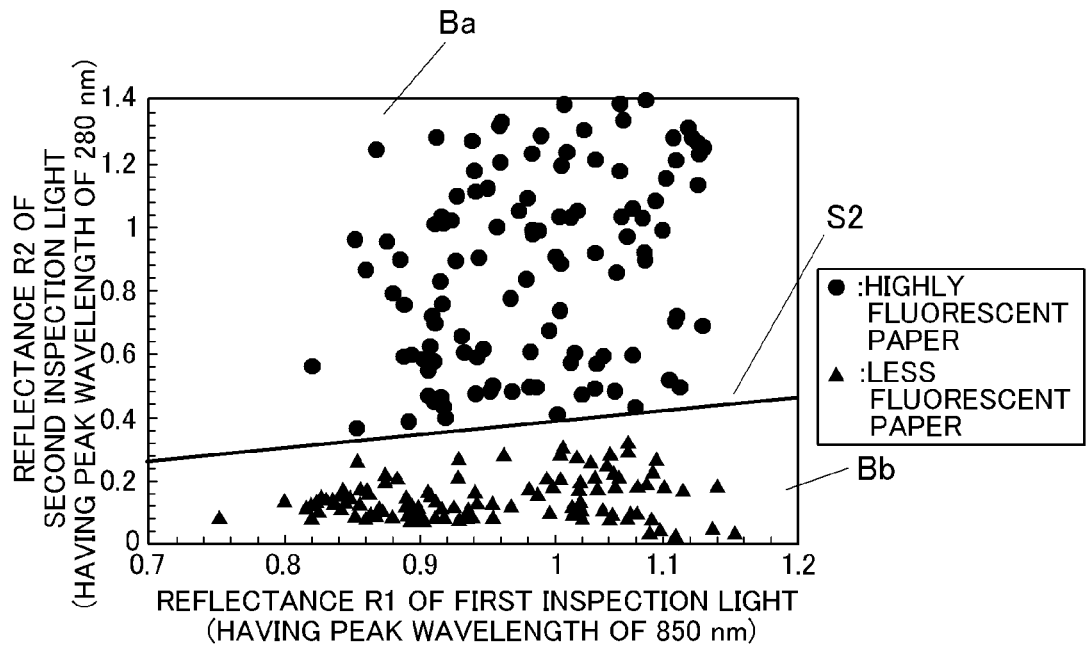
FIG. 15 is a diagram showing an example of distributions of the reflectance R1 of the first inspection light and the reflectance R2 of the second inspection light on highly fluorescent paper and less fluorescent paper.

FIG. 15 is a diagram showing an example of distributions of the reflectance R1 of the first inspection light L1a and the reflectance R2 of the second inspection light L2a on highly fluorescent paper and less fluorescent paper. Highly fluorescent paper is a recording medium to which more than or equal to a predetermined amount of a fluorescent whitening agent has been added. Less fluorescent paper is a recording medium to which a fluorescent whitening agent has not been added or an added amount is less than the predetermined amount. FIG. 15 is obtained by acquiring and plotting, for highly fluorescent paper and less fluorescent paper, the reflectance R1 of the first inspection light L1a having a peak wavelength of 850 nm and the reflectance R2 of the second inspection light L2a having a peak wavelength of 280 nm.

A reference line S2 in FIG. 15 is a line corresponding to a reflectance ratio expressed as: R2/R1=0.38. In other words, the reference line S2 is a linear function (proportional expression) that passes through the origin and has an inclination of the reference value V (=0.38). A coordinate plane obtained by using the reflectances R1 and R2 as the two axes is separated into two regions Ba and Bb by the reference line S2. The region Ba corresponds to the reflectance ratio expressed as: R2/R1≥V, and the region Bb corresponds to the reflectance ratio expressed as: R2/R1<V. The plot of the highly fluorescent paper is distributed in the region Ba, and the plot of the less fluorescent paper is distributed in the region Bb. This enables the recording medium to be determined as highly fluorescent paper in a case in which a detection result of the amount of incident light when any recording medium is inspected by the medium inspection unit 20 satisfies the reflectance ratio expressed as: R2/R1≥V (a case of being included in the region Ba), and enables the recording medium to be determined as less fluorescent paper in a case in which the detection result satisfies the reflectance ratio expressed as: R2/R1<V (a case of being included in the region Bb). In other words, in a case of determining the recording medium in Example 3, step S106 in the flowchart of FIG. 13 is changed to "DETERMINE RECORDING MEDIUM AS HIGHLY FLUORESCENT PAPER", and step S107 is changed to "DETERMINE RECORDING MEDIUM AS LESS FLUORESCENT PAPER".

In Example 3, by using the reflectance ratio R2/R1 between the first inspection light L1a and the second inspection light L2a, a determination considering wavelength dependency in two wavelength regions is made. In other words, by using not only the reflectance R2 on the vertical axis in FIG. 15 but also the ratio to the reflectance R1 on the horizontal axis, a factor other than the fluorescent whitening agent is offset.

Similarly to Examples 1 and 2, the reference line S2 may be expressed as R2=a·R1+b where a and b are any constants (a≠0). The coordinate plane may be separated into three or more regions by two or more reference lines, and the amount of the fluorescent whitening agent may be determined based on to which of the regions coordinates corresponding to a detection result of the amount of incident light when the recording medium is inspected by the medium inspection unit 20 belong.

Example 1+Example 3: Determination Depending on Both Material of Recording Medium and Fluorescent Whitening Example 1 and Example 3 may be combined. In other words, a single recording medium may be subjected to the determination depending on the material in Example 1 and the determination depending on the fluorescent whitening agent in Example 3 in combination.

Figure 16:
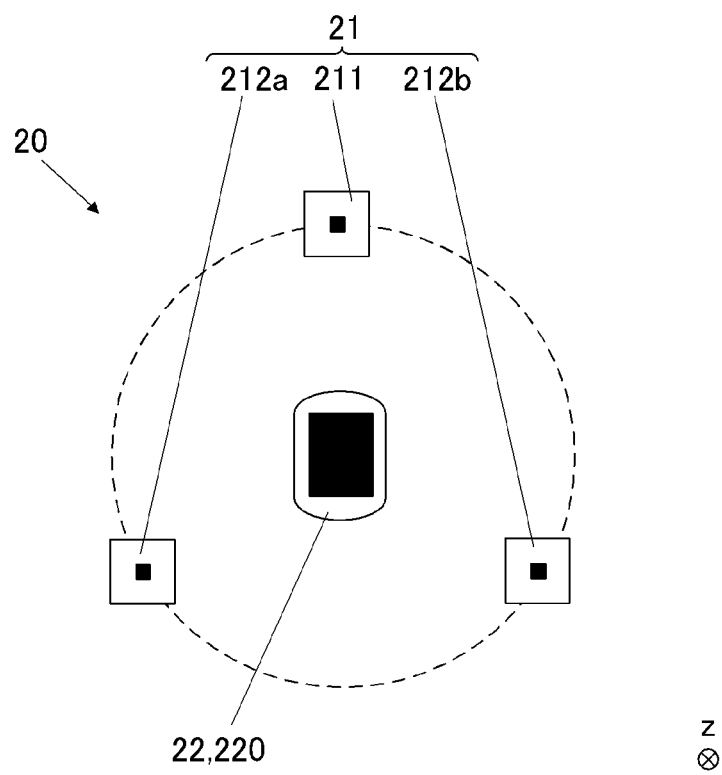
FIG. 16 is a diagram showing a configuration of a medium inspection unit in a case of combining Example 1 and Example 3.

FIG. 16 is a diagram showing a configuration of the medium inspection unit 20 in the case of combining Example 1 and Example 3.

As shown in FIG. 16, a single first light emitting element 211 and two second light emitting elements 212 (second light emitting elements 212a and 212b) are arranged at regular intervals on a circle centering on the light receiving element 220 of the light detector 22 as seen in the z direction. The second light emitting element 212a among them emits the second inspection light L2a having an intensity whose peak wavelength is more than or equal to 390 nm and less than or equal to 440 nm to the recording medium as in Example 1. The second light emitting element 212b emits the second inspection light L2a having an intensity whose peak wavelength is more than or equal to 280 nm and less than or equal to 400 nm to the recording medium as in Example 3. In the configuration of FIG. 16, the first light emitting element 211 and the two second light emitting elements 212a and 212b emit light in sequence in such a manner that emission periods are different from each other. A determination depending on the material of the recording medium is made from the reflectance R1 of the first inspection light L1a from the first light emitting element 211 and the reflectance R2 of the second inspection light L2a from the second light emitting element 212a. A determination depending on the fluorescent whitening agent is made from the reflectance R1 of the first inspection light L1a from the first light emitting element 211 and the reflectance R2 of the second inspection light L2a from the second light emitting element 212b.

Example 2 and Example 3 can also be combined by using the configuration of FIG. 16.

Example 4: Determination Depending on Color of Recording Medium

A method of determining the color of the recording medium will now be described as Example 4.

In Example 4, light having an absorption wavelength of a dye of colored paper is used as the second inspection light L2a. This enables a recording medium of a corresponding color to be determined.

For example, by using the second inspection light L2a having a peak wavelength of more than or equal to 600 nm and less than 700 nm, paper (for example, blue, red, green, yellow, pink, pale green, pale yellow, pale ivory, or orange-based paper) that has significant absorption in a wavelength region of more than or equal to 600 nm and less than 700 nm and white paper are distinguished.

Figure 17:
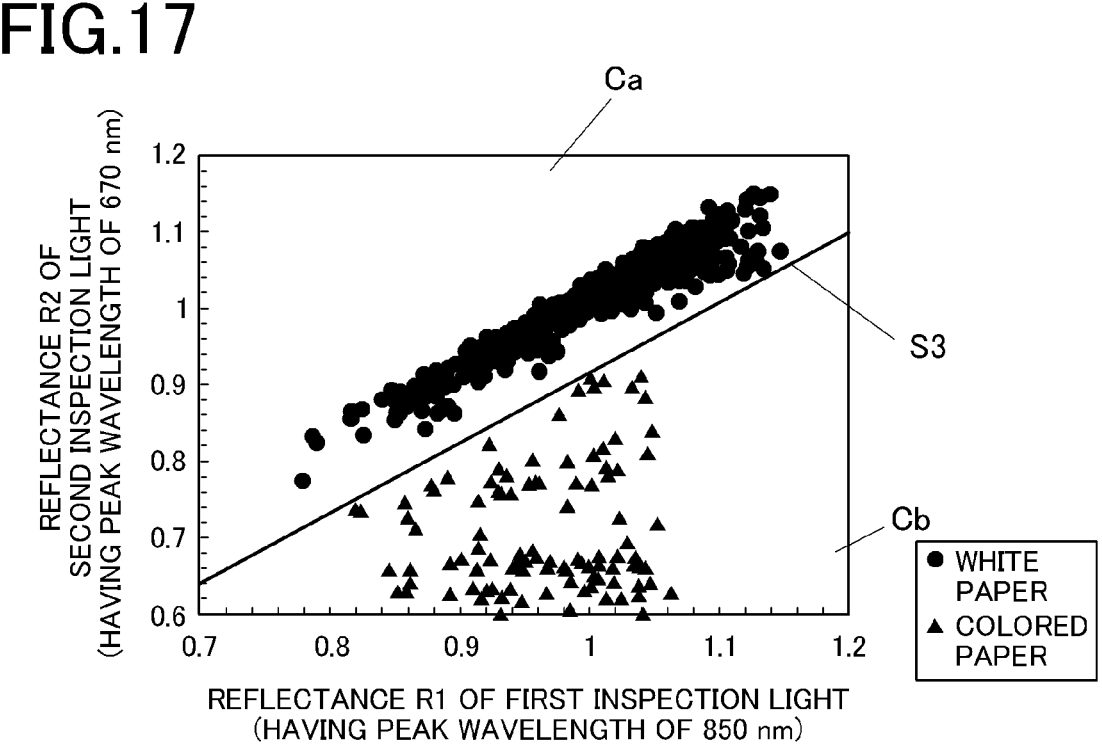
FIG. 17 is a diagram showing an example of distributions of the reflectance R1 of the first inspection light and the reflectance R2 of the second inspection light on white paper and colored paper.

FIG. 17 is a diagram showing an example of distributions of the reflectance R1 of the first inspection light L1a and the reflectance R2 of the second inspection light L2a on white paper and colored paper. Describing in detail, the reflectance R1 of the first inspection light L1a having a peak wavelength of 850 nm and the reflectance R2 of the second inspection light L2a having a peak wavelength of 670 nm are acquired and plotted for white paper and colored paper.

A reference line S3 in FIG. 17 is set so as to separate the plot of white paper and the plot of colored paper. A coordinate plane obtained by using the reflectances R1 and R2 as the two axes is separated by the reference line S3 into a region Ca including the plot of white paper and a region Cb including the plot of colored paper. The recording medium is determined as either white paper or colored paper depending on to which of the regions Ca and Cb the coordinates corresponding to a detection result of the amount of incident light when the recording medium is inspected by the medium inspection unit 20 belong.

By using the second inspection light L2a having a peak wavelength of more than or equal to 500 nm and less than 600 nm, paper (for example, blue, green, yellow, pale blue, pale yellow, or pale green-based paper) that has significant absorption in a wavelength region of more than or equal to 500 nm and less than 600 nm and white paper are distinguished.

Figure 18:
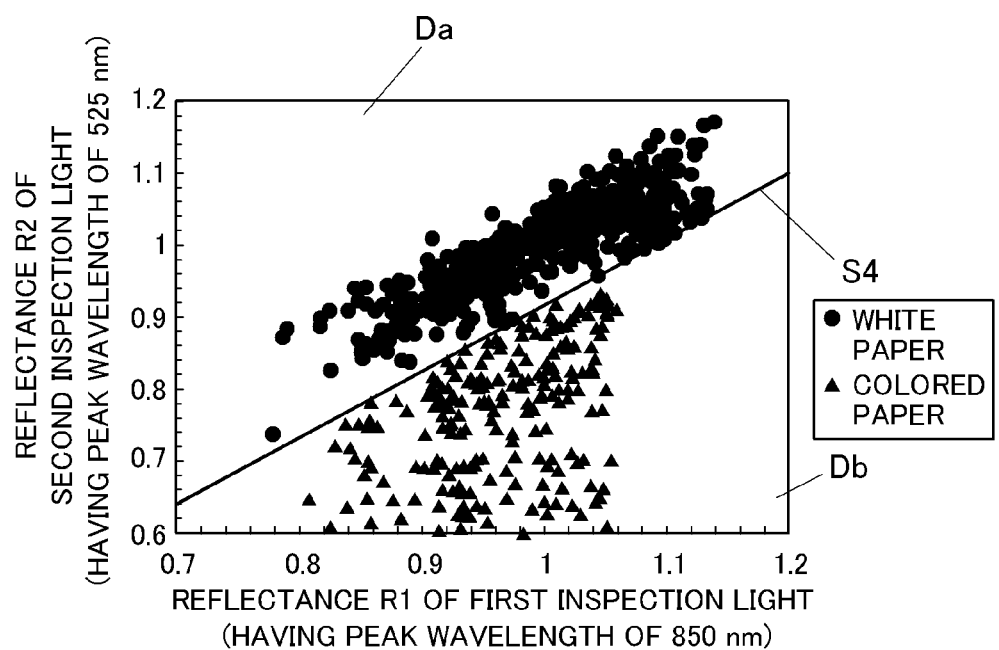
FIG. 18 is a diagram showing an example of distributions of the reflectance R1 of the first inspection light and the reflectance R2 of the second inspection light on white paper and colored paper.

FIG. 18 is a diagram showing an example of distributions of the reflectance R1 of the first inspection light L1a and the reflectance R2 of the second inspection light L2a on white paper and colored paper. Describing in detail, the reflectance R1 of the first inspection light L1a having a peak wavelength of 850 nm and the reflectance R2 of the second inspection light L2a having a peak wavelength of 525 nm are acquired and plotted for white paper and colored paper.

A reference line S4 in FIG. 18 is set so as to separate the plot of white paper and the plot of colored paper. A coordinate plane obtained by using the reflectances R1 and R2 as the two axes is separated by the reference line S4 into a region Da including the plot of white paper and a region db including the plot of colored paper. The recording medium is determined as either white paper or colored paper depending on to which of the regions Da and db the coordinates corresponding to a detection result of the amount of incident light when the recording medium is inspected by the medium inspection unit 20 belong.

Similarly, by using the second inspection light L2a having a peak wavelength of more than or equal to 350 nm and less than 500 nm, paper (for example, red, green, yellow, pink, or pale green-based paper) that has significant absorption in a wavelength region of more than or equal to 350 nm and less than 500 nm and white paper are distinguished. A distribution chart of the reflectances in this case is omitted.

By using the first inspection light L1a and two or more rays of the second inspection light L2a different in wavelength region, the color of the recording medium is also determined in more detail. For example, in a case of using two rays of the second inspection light L2a different in wavelength region, the single first light emitting element 211 and the two second light emitting elements 212 different in emission wavelength are used similarly to FIG. 16. In a case of using three rays of the second inspection light L2a different in wavelength region, the second light emitting element 212 further different in emission wavelength is added.

In Example 4, the reflectance ratio R2/R1 between the first inspection light L1a and the second inspection light L2a is also used to make a determination considering wavelength dependency in two wavelength regions. In other words, by using not only the reflectance R2 on the vertical axis in FIG. 17 and FIG. 18 but also the ratio to the reflectance R1 on the horizontal axis, a factor other than the color of the recording medium is offset.

Modification

A modification of the above-described first embodiment will now be described. Hereinafter, differences from the above-described first embodiment will be described.

Figure 19A:
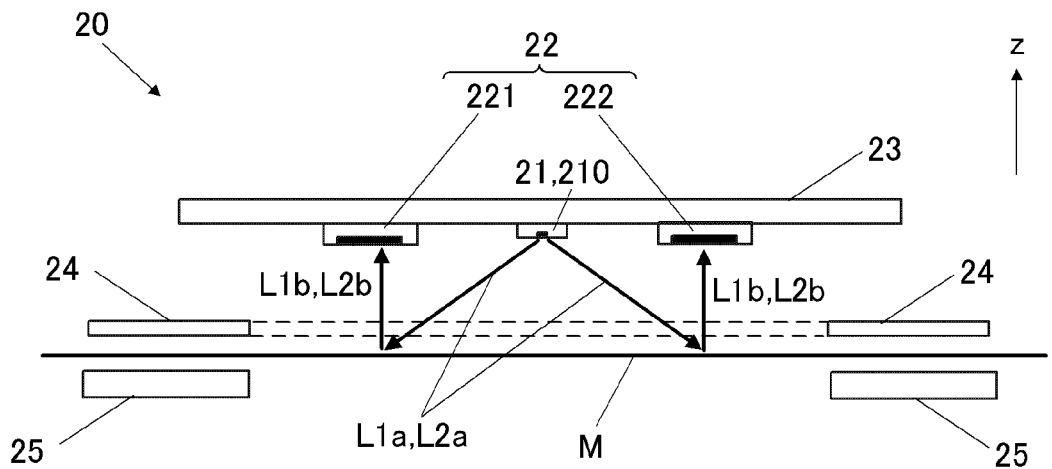
FIG. 19A is a diagram showing a configuration of a medium inspection unit according to a modification.
Figure 19B:
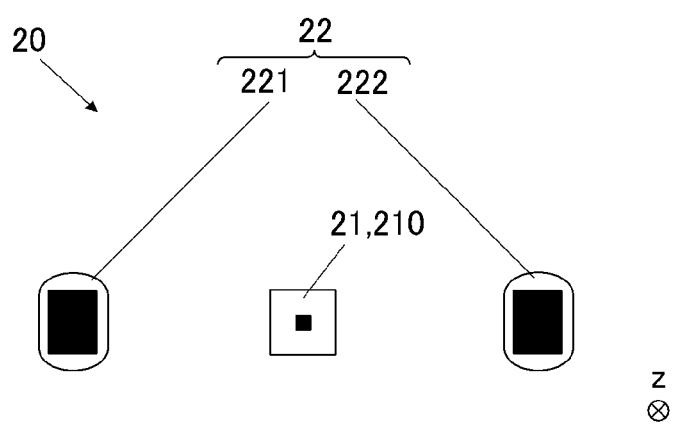
FIG. 19B is a diagram showing the configuration of the medium inspection unit according to the modification.

FIG. 19A and FIG. 19B are diagrams showing a configuration of the medium inspection unit 20 according to the modification. FIG. 19A is a cross-sectional view of the medium inspection unit 20 as seen in a direction parallel to a conveyance plane. FIG. 19B is a plan view of the medium inspection unit 20 as seen in the direction (z direction) vertical to the conveyance plane.

The light emitter 21 of the present modification includes a single light emitting element 210. The light emitting element 210 emits light including the first inspection light L1a and the second inspection light L2a to the recording medium M. A lamp (such as, for example, a halogen, heavy hydrogen, tungsten, or xenon lamp) having an emission spectrum in a wavelength range (for example, from the ultraviolet wavelength region to the near-infrared wavelength region) including the first inspection light L1a and the second inspection light L2a is used as the light emitting element 210.

Figure 20:
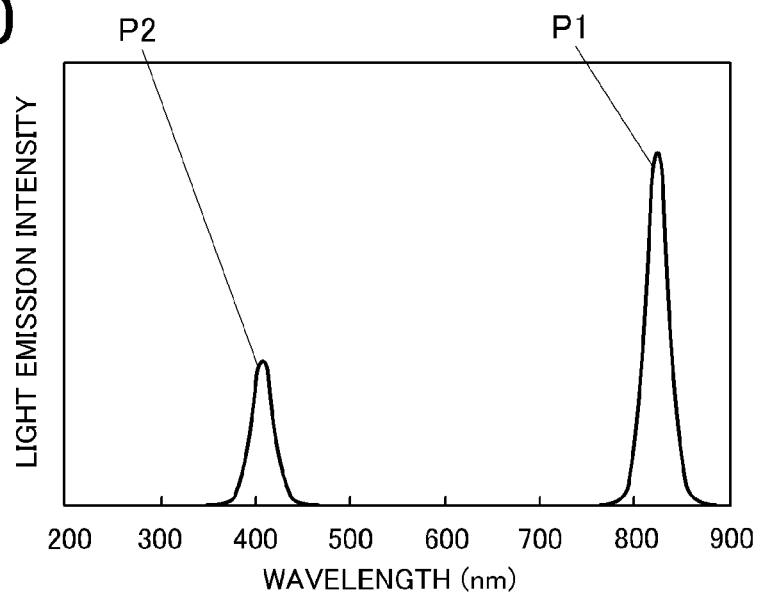
FIG. 20 is a diagram showing an example of spectral sensitivity properties of a first light receiving element and a second light receiving element.

The light detector 22 has the first light receiving element 221 that detects light in a wavelength region of the first incident light L1b, and the second light receiving element 222 that detects light in a wavelength region of the second incident light L2b. For example, the light receiving element 220 of the above-described first embodiment on which a filter that selectively transmits light in the wavelength range of the first incident light L1b has been laminated is used as the first light receiving element 221. The light receiving element 220 of the above-described first embodiment on which a filter that selectively transmits light in the wavelength range of the second incident light L2b has been laminated is used as the second light receiving element 222. With such a configuration, the first light receiving element 221 and the second light receiving element 222 have spectral sensitivity properties shown in FIG. 20. In other words, the first light receiving element 221 has a peak P1 of sensitivity at the wavelength of 850 nm, for example. The second light receiving element 222 has a peak P2 of sensitivity at the wavelength of 400 nm, for example. Thus, as shown in FIG. 19A, while light including the first incident light L1$b$ and the second incident light L2$b$ enter the first light receiving element 221 and the second light receiving element 222, respectively, the first light receiving element 221 selectively detects the first incident light L1$b$, and the second light receiving element 222 selectively detects the second incident light L2$b$. The peak wavelength of the sensitivity of the second light receiving element 222 is changed as appropriate in agreement with the wavelength region of the second inspection light L2$a$ (therefore, the wavelength region of the second incident light L2$b$).

In this manner, the present modification performs space division measurement, and is thus advantageous in that time division measurement is not required. In other words, light is detected by the first light receiving element 221 and the second light receiving element 222 at any timing (for example, at the same time) in the emission period of the light emitting element 210.

As described above, the recording medium determination device 2 according to the present embodiment includes the light emitter 21 that emits inspection light to the recording medium, the light detector 22 that detects incident light including at least one of diffuse reflected light of the inspection light emitted to the recording medium and fluorescent light excited by the inspection light on the recording medium, and the controller 10 that makes a determination depending on a property of the recording medium based on a detection result of the first incident light L1$b$ in accordance with the first inspection light L1$a$ and the second incident light L2$b$ in accordance with the second inspection light L2$a$ obtained by the light detector 22. The first inspection light L1$a$ has an intensity whose peak wavelength is more than or equal to 750 nm and less than or equal to 1100 nm, and the second inspection light L2$a$ has an intensity whose peak wavelength is shorter than the peak wavelength of the first inspection light L1$a$. Accordingly, by using inspection light in two wavelength regions including the first inspection light L1$a$ in the near-infrared wavelength region that is less likely to be influenced by properties of the recording medium, one of the properties of the recording medium is appropriately determined considering wavelength dependency in the two wavelength regions of diffuse reflected light and/or fluorescent light in the recording medium. In other words, since variation in the amount of received light of the second incident light L2$b$ caused by a factor other than the property of the recording medium is deducted based on the amount of received light of the first incident light L1$b$, a determination depending on a desired property is appropriately made. The class of the recording medium is determined with high accuracy by using a determination result of this property. Since a comparison with data acquired for a known recording medium is not required to be made, the paper type or the like can also be determined for an unknown recording medium.

The controller 10 makes a determination depending on a property of the recording medium based on the ratio between the reflectance R1 (first value) in accordance with the amount of the first incident light L1$b$ received by the light detector 22 and the reflectance R2 (second value) in accordance with the amount of the second incident light L2$b$ received by the light detector 22. This enables a factor by which the reflectances vary other than a property of the recording medium targeted for determination to be offset, and the property to be determined with high accuracy. For example, even in a case in which a positional relationship of the light emitting elements and the light receiving element with the recording medium is displaced to cause the reflectances to vary, or the reflectances vary due to differences in basis weight between recording media, the variation is offset by using the reflectance ratio.

The controller 10 makes a determination depending on a property based on a region including coordinates corresponding to a detection result among a previously determined plurality of regions on the coordinate plane obtained by using the reflectance R1 and the reflectance R2 as the two axes. This enables the property of the recording medium to be determined more correctly, and the accuracy of determining the class of the recording medium to be increased.

The plurality of regions are separated by a reference line not parallel to the two axes of the coordinate plane. This enables the property to be determined considering wavelength dependency of diffuse reflected light and/or fluorescent light in the recording medium.

In Examples 1 and 2, the second inspection light L2$a$ has an intensity whose peak wavelength is more than or equal to 390 nm and less than or equal to 440 nm. This enables a property having absorption in the violet wavelength region, for example, the material of the recording medium, whether bluing has been performed, or the like to be determined.

In Example 3, the second inspection light L2$a$ has an intensity whose peak wavelength is more than or equal to 280 nm and less than or equal to 400 nm. This enables the presence/absence and amount of a fluorescent whitening agent to be determined.

The first inspection light L1$a$ has an intensity whose peak wavelength is more than or equal to 800 nm and less than or equal to 900 nm. This enables variation in reflectance of the first inspection light L1$a$ due to the influence of the property of the recording medium to be reduced further, thereby improving the accuracy of determining the property.

The light detector 22 has the light receiving element 220. The light receiving element 220 is a photodiode or a phototransistor having a detection sensitivity in the wavelength region from the visible wavelength region to the near-infrared wavelength region. This reduces an influence of excitation light in the ultraviolet wavelength region, and enables fluorescent light or blue diffuse reflected light and/or fluorescent light in the visible wavelength region to be detected at a high sensitivity. Thus, the material of the recording medium and the presence/absence and amount of a fluorescent whitening agent are determined with high accuracy.

The recording medium determination device 2 includes the element substrate 23 provided at a position opposite to the conveyance path of the recording medium. The light emitter 21 has the first light emitting element 211 and the second light emitting element 212. The light detector 22 has the light receiving element 220. The first light emitting element 211, the second light emitting element 212, and the light receiving element 220 are provided on the element substrate 23. Accordingly, even if the distance between the element substrate 23 and the recording medium in the z direction varies, the influence on a determination result of a property is minimized.

The light emitter 21 has the first light emitting element 211 that emits the first inspection light L1$a$ to the recording medium and the second light emitting element 212 that emits the second inspection light L2$a$ to the recording medium. The light detector 22 has the light receiving element 220 that detects the first incident light L1$b$ and the second incident light L2$b$. The period in which the first light emitting element 211 emits the first inspection light L1$a$ is different from the period in which the second light emitting element 212 emits the second inspection light L2a. This simplifies the configuration of the light receiving element 220, and a configuration and processing content for processing a detection result obtained by the light receiving element 220. In addition, an influence of temporal changes of the light receiving element 220 is reduced.

In the modification, the light emitter 21 has the light emitting element 210 that emits light including the first inspection light L1a and the second inspection light L2a to the recording medium. The light detector 22 has the first light receiving element 221 that detects light in the wavelength region of the first incident light L1b and has the second light receiving element 222 that detects light in the wavelength region of the second incident light L2b. Since this enables the first light receiving element 221 and the second light receiving element 222 to detect light at the same time, the inspection time is shortened. In principle, the class of the recording medium can also be determined by a single emission of inspection light and detection of incident light. In addition, an influence of temporal changes of the light emitting element 210 is reduced.

The image formation device 1 according to the present embodiment includes the above-described recording medium determination device 2, and the image former 30 that provides the recording medium with a color material to form an image. This enables the class of the recording medium to be determined appropriately in the image formation device 1.

The recording medium determination method according to the present embodiment is a recording medium determination method to be performed by the recording medium determination device 2 including the light emitter 21 that emits inspection light to a recording medium, and the light detector 22 that detects incident light including at least one of diffuse reflected light of the inspection light emitted to the recording medium and fluorescent light excited by the inspection light on the recording medium. The method includes making a determination depending on a property of the recording medium based on a detection result of the first incident light L1b in accordance with the first inspection light L1a and the second incident light L2b in accordance with the second inspection light L2a obtained by the light detector 22. The first inspection light L1a has an intensity whose peak wavelength is more than or equal to 750 nm and less than or equal to 1100 nm. The second inspection light L2a has an intensity whose peak wavelength is shorter than the peak wavelength of the first inspection light L1a. This enables a property of the recording medium to be appropriately determined considering wavelength dependency in two wavelength regions of diffuse reflected light and/or fluorescent light in the recording medium. The class of the recording medium is determined with high accuracy by using this determination result of the property.

The present invention is not limited to the above-described first embodiment, but can be modified variously.

For example, the above-described first embodiment has been described using an example in which the recording medium determination device 2 is incorporated in the image formation device 1, but this is not a limitation. The recording medium determination device 2 may be a device provided separately and independently from the image formation device 1.

Although the reflectance R1 is illustrated as the first value, and the reflectance R2 is illustrated as the second value, this is not a limitation. The first value may be any value depending on the amount of the first incident light L1b received by the light detector 22, and may be the amount of received light itself, for example. Similarly, the second value may be any value depending on the amount of the second incident light L2b received by the light detector 22, and may be the amount of received light itself, for example.

A property of the recording medium targeted for determination is not limited to those illustrated in the first embodiment. Any property in which the reflectance of the first inspection light L1a in the near-infrared wavelength region is less likely to be influenced and the reflectance of the second inspection light L2a in a wavelength region shorter than the near-infrared wavelength region is thereby influenced is targeted for determination.

Although the electrophotographic method has been illustrated as an image forming method in the image formation device, this is not a limitation. Any image forming method is adopted. For example, the ink jet method of discharging ink to a recording medium and forming an image may be adopted.

The recording medium is not limited to paper, but may be a resin sheet or cloth.

Second Embodiment

Hereinafter, a recording medium determination device and an image formation device according to a second embodiment will be described with reference to the drawings.

Configuration of Image Formation Device

Figure 21:
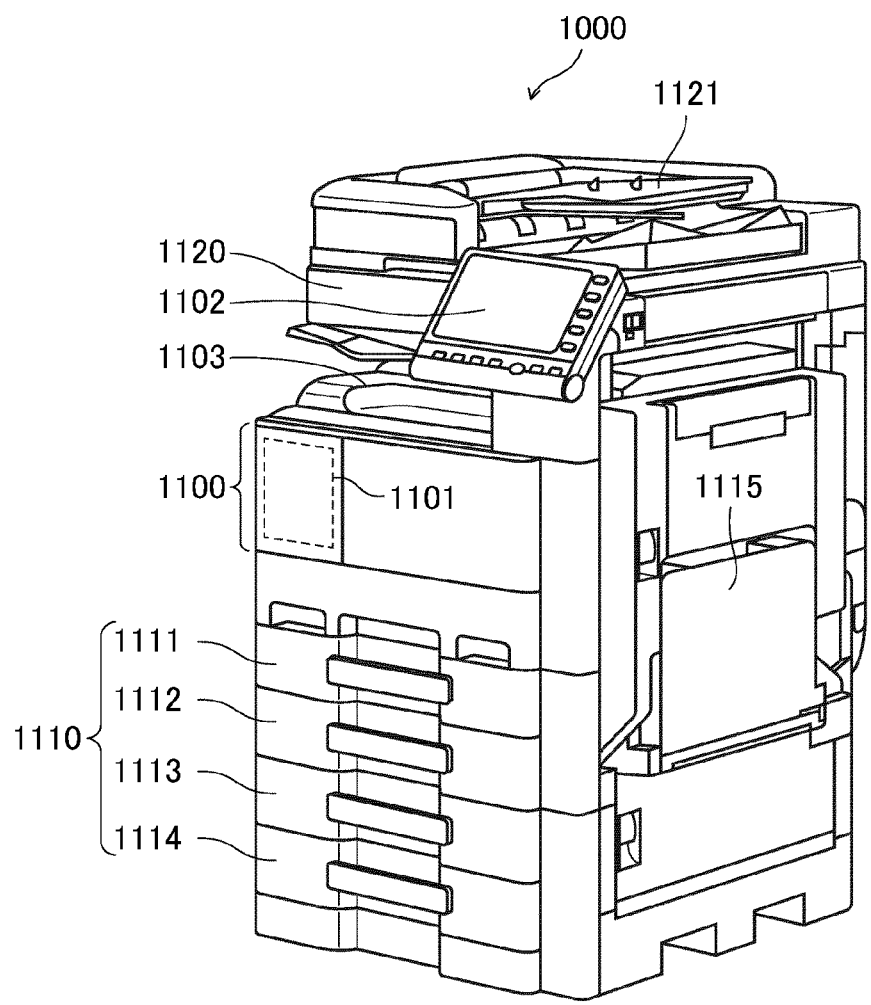
FIG. 21 is a perspective appearance diagram showing essential components of an image formation device 1 according to a second embodiment of the present disclosure.

First, a configuration of the image formation device according to the present embodiment will be described. As shown in FIG. 21, an image formation device 1000 is what is called a multi-function peripheral (MFP), and includes an image generator 1100, a paper feeder 1110, and a scanner 1120. The image formation device 1000 has a recording medium determination device.

The image generator 1100 includes a controller 1101 (hardware processor) and an operation panel 1102. The image generator 1100 executes image forming processing when an image forming instruction is received from a user through the operation panel 1102 or when an image forming instruction is received from another device with the controller 1101.

The paper feeder 1110 includes paper feed trays 1111, 1112, 1113, and 1114, and a manual bypass tray 1115. The paper feed trays 1111, 1112, 1113, and 1114 store recording media of types different from each other. The user of the image formation device 1000 places a desired recording medium on the manual bypass tray 1115.

The paper feeder 1110 supplies a recording medium from any of the paper feed trays 1111, 1112, 1113, and 1114 and the manual bypass tray 1115 to the image generator 1100 in accordance with the image forming instruction received by the image generator 1100.

Figure 22:
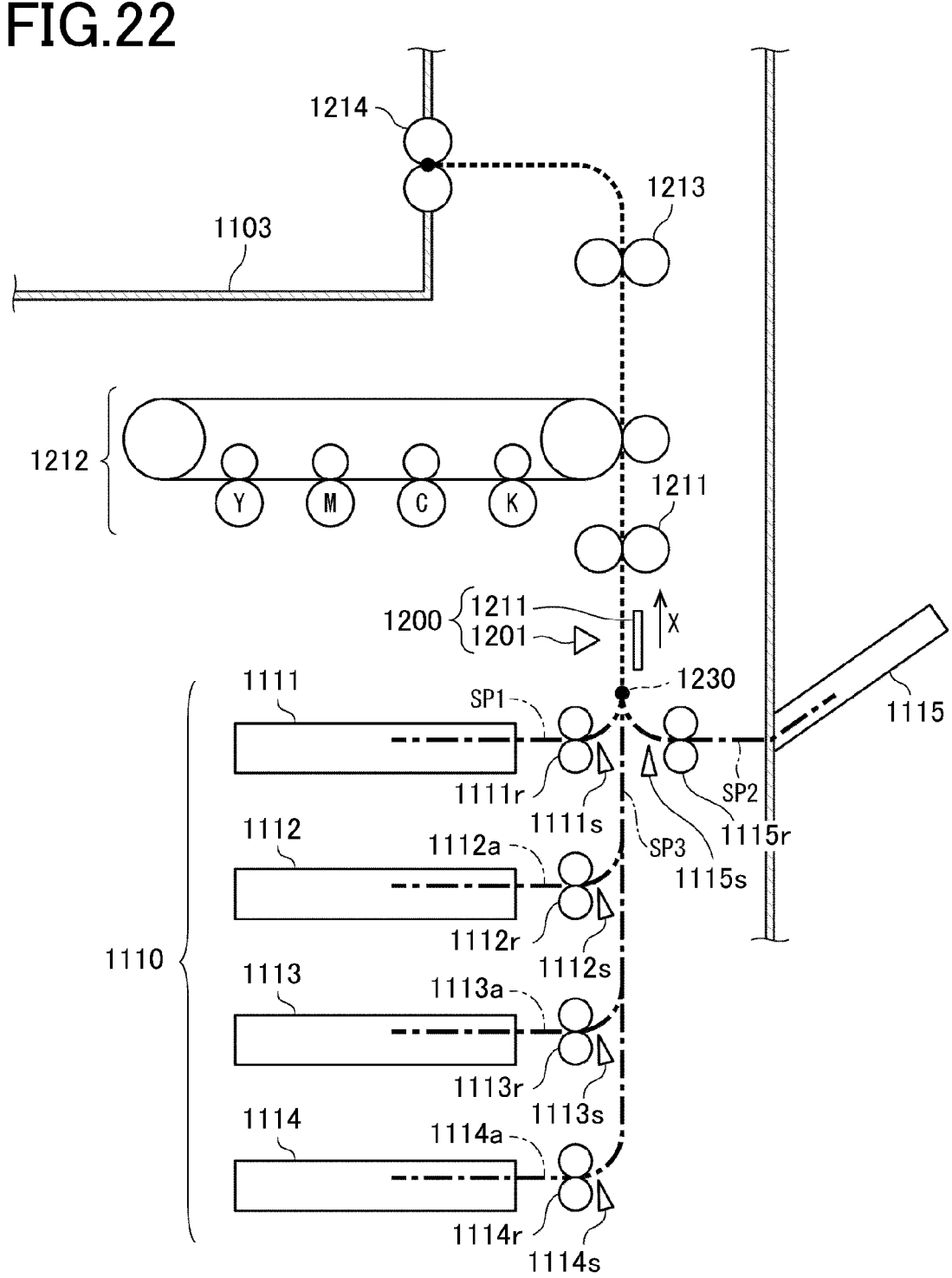
FIG. 22 is a diagram showing essential internal components of the image formation device 1.

As shown in FIG. 22, the paper feeder 1110 is provided with paper feed rollers 1111r, 1112r, 1113r, 1114r, and 1115r, which respectively supply recording media one by one from the top of a bundle of recording media stored in the paper feed trays 1111, 1112, 1113, and 1114 and the manual bypass tray 1115.

The paper feeder 1110 has recording medium sensors 1111s, 1112s, 1113s, 1114s, and 1115s, which respectively detect the leading end of a recording medium supplied from the paper feed trays 1111, 1112, 1113, and 1114 and the manual bypass tray 1115.

A recording medium supplied from the paper feed tray 1111 pass through a recording medium conveyance path SP1, and is conveyed to a resist roller 1211. Recording media supplied from the paper feed trays 1112, 1113, and 1114 pass through a recording medium conveyance path SP3, and are conveyed to the resist roller 1211. A recording medium supplied from the manual bypass tray 1115 passes through a recording medium conveyance path SP2, and is conveyed to the resist roller 1211.

Figure 23A:
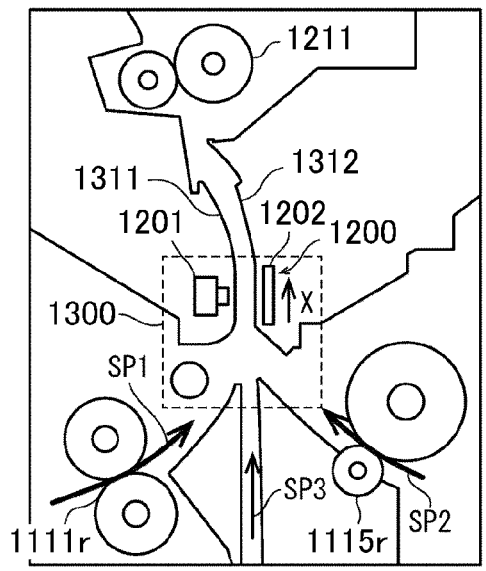
FIG. 23A is a diagram showing an arrangement of a medium inspection unit in the image formation device.

As shown in FIG. 23A, the recording medium conveyance paths SP1, SP2, and SP3 join together to be a single recording medium conveyance path between the paper feed trays 1111, 1112, 1113, 1114, and the manual bypass tray 1115 and the resist roller 1211. A medium inspection unit (optical sensor unit) 1200 is disposed between the joint of the recording medium conveyance paths SP1, SP2, and SP3 and the resist roller 1211.

The medium inspection unit 1200 has an element substrate (optical sensor substrate) 1201 and a reflection-purpose reference plate 1202. The element substrate 1201 emits light toward a recording medium under the control of the controller 1101, and receives reflected light from the recording medium, thereby detecting the amount of reflected light, as will be described later.

The controller 1101 determines the type of the recording medium referring to the amount of reflected light detected by the element substrate 1201, and sets image forming conditions in accordance with the determined type of the recording medium. The image forming conditions include transfer bias for transferring toner images to the recording medium, a fixing temperature at which the toner images are fixed to the recording medium, and the like.

The reflection-purpose reference plate 1202 is a white plate to be used for the element substrate 1201 to adjust the amount of emitted light. The element substrate 1201 adjusts the amount of emitted light such that the amount of reflected light from the reflection-purpose reference plate 1202 has a predetermined value in a state in which no recording medium is present on the recording medium conveyance path.

The recording medium conveyance path has a conveyance path thickness (height) with a room left for the thickness of a recording medium in order to smoothly convey the recording medium. Thus, the position of the recording medium being conveyed may vary in the height direction of the conveyance path.

Figure 23B:
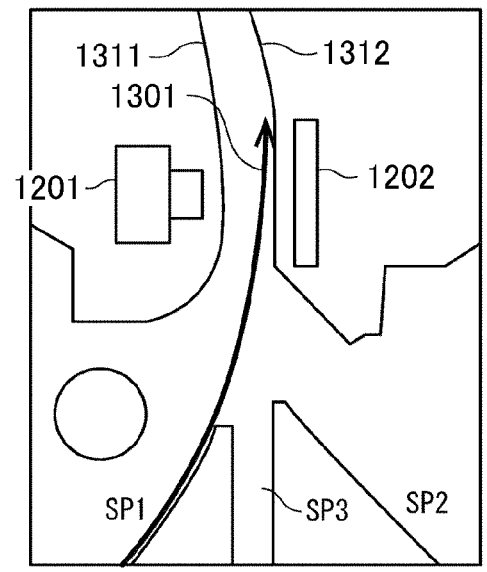
FIG. 23B is a diagram illustrating a conveyance state of a recording medium supplied from an uppermost paper feed tray.

At a position at which the medium inspection unit 1200 detects the recording medium on the recording medium conveyance path, the distance from the medium inspection unit 1200 to the recording medium may vary. For example, FIG. 23B is a magnified view of a rectangular region 1300 in FIG. 23A. In a case in which the recording medium is conveyed via the recording medium conveyance path SP1, the recording medium is conveyed from the element substrate 1201 side. Thus, the recording medium is going to elastically return to a flat state by virtue of resilience of the recording medium itself, and passes through a position 1301 far from the element substrate 1201.

Figure 23C:
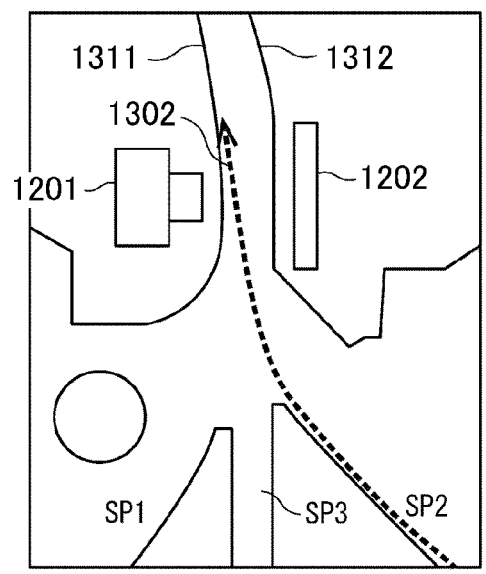
FIG. 23C is a diagram illustrating a conveyance state of a recording medium supplied from a manual bypass tray.

As shown in FIG. 23C, in a case in which the recording medium is conveyed via the recording medium conveyance path SP2, the recording medium is conveyed from the reflection-purpose reference plate 1202 side. Thus, the recording medium is going to elastically return to the flat state by virtue of resilience of the recording medium itself, and passes through a position 1302 close to the element substrate 1201.

Figure 23D:
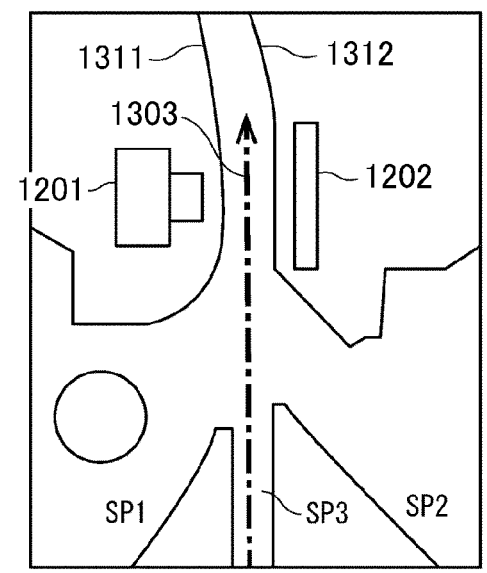
FIG. 23D is a diagram illustrating a conveyance state of a recording medium supplied from a paper feed tray other than the uppermost tray.

In a case in which the recording medium is conveyed via the recording medium conveyance path SP3, the recording medium is conveyed in the flat state. Thus, as shown in FIG. 23D, the recording medium may pass through an intermediate position 1303 between the element substrate 1201 and the reflection-purpose reference plate 1202, but unstably comes closer to the element substrate 1201 or departs from the element substrate 1201.

Even if recording media are of the same type, the amount of reflected light from a recording medium is larger in a case in which the recording medium passes through a position closer to the element substrate 1201, while the amount of reflected light from a recording medium is smaller in a case in which the recording medium passes through a position farther from the element substrate 1201. Thus, when determining the type of a recording medium using the amount of reflected light from the recording medium, the determination accuracy may degrade due to variation in the position through which the recording medium passes.

The recording medium is subjected to skew correction with its head abutted against the resist roller 1211 stopped rotating. Then, when the resist roller 1211 starts rotating in accordance with a timing of transferring toner images formed by an image former 1212, the recording medium is conveyed to a secondary transfer position of the image former 1212.

The image former 1212 forms toner images in accordance with image forming conditions set by the controller 1101. Although FIG. 22 shows a configuration in which the image former 1212 forms color toner images by a tandem system, the image former 1212 may form color toner images by a method other than the tandem system, or may form monochrome toner images.

After transfer of the toner images at the secondary transfer position, the toner images are thermally fixed to the recording medium by a fixing unit 1213. The fixing unit 1213 thermally fixes the toner images also in accordance with the image forming conditions set by the controller 1101. Thereafter, the recording medium is discharged onto a paper ejection tray 1103 by a discharging roller 1214.

Referring back to FIG. 21, the scanner 1120 reads originals either by a sheet-through method or a platen-set method to generate image data. When reading the originals by the sheet-through method, the scanner 1120 reads the originals conveyed by an automatic original conveyor 1121 one by one from a bundle of the originals.

In the case of the platen-set method, the scanner 1120 reads an original placed on a platen glass not shown. In a case of duplicating an original, for example, the image generator 1100 forms an image using image data generated by the scanner 1120.

Configuration of Medium Inspection Unit 1200

A configuration of the medium inspection unit 1200 will now be described.

Figure 24A:
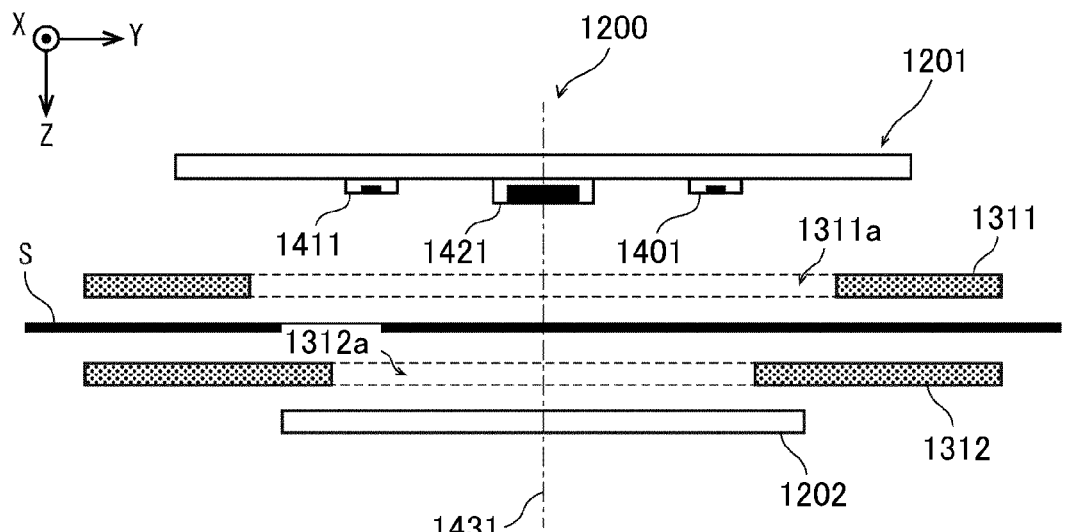
FIG. 24A is a diagram of essential components of the medium inspection unit as seen in a recording medium conveyance direction.

As shown in FIG. 24A, guide plates 1311 and 1312 that guide a recording medium S so as to be conveyed along the recording medium conveyance path are provided with through-holes 1311a and 1312a at positions opposite to each other with the recording medium conveyance path interposed therebetween.

In the present embodiment, the x direction is the recording medium conveyance direction, and the y direction is a conveyance width direction perpendicular to the recording medium conveyance direction. The z direction is a recording medium thickness direction. The present embodiment is mainly aimed at reducing the influence exerted by positional variation of a recording medium in the z direction.

Figure 24B:
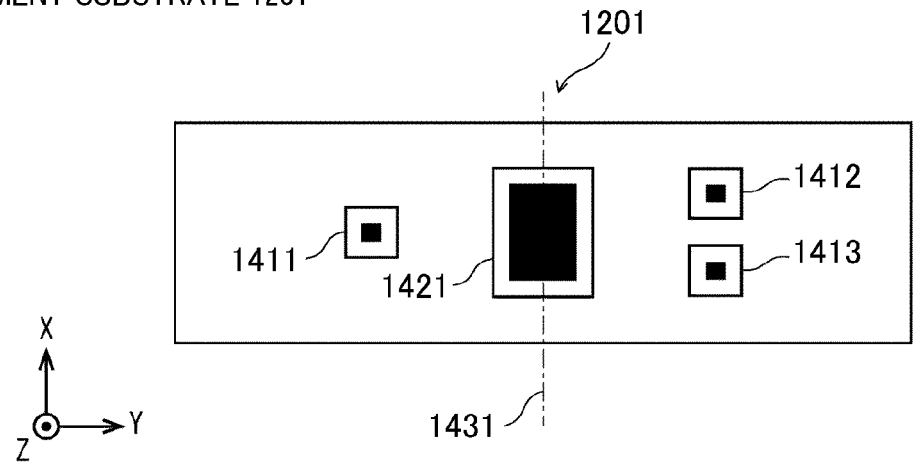
FIG. 24B is a plan view showing a configuration of an element substrate.

The element substrate 1201 is disposed at a position opposite to the recording medium S with the through-hole 1311a interposed therebetween. As shown in FIG. 24B, light emitting elements (light sources) 1411, 1412 and 1413, and a light receiving element 1421 are disposed on a substrate surface of the element substrate 1201 opposite to the through-hole 1311a. The light emitting elements 1411, 1412, and 1413 are reflection-purpose light emitting elements to be used for detecting a reflection property of the recording medium for each wavelength of light that enters the recording medium. The light emitting elements 1411, 1412, and 1413 are one mode of the light emitter. The light receiving element 1421 is one mode of the light detector.

Light emitting diodes (LED), for example, are used for the light emitting elements 1411, 1412, and 1413. A photodiode may be used for the light receiving element 1421.

Light emitted from the light emitting elements 1411, 1412, and 1413 while the recording medium S is passing is emitted to the recording medium S through the through-hole 1311a. Of the light emitted to the recording medium S, reflected light enters the light receiving element 1421 through the through-hole 1311a again.

The light emitting elements 1411, 1412, and 1413 are disposed such that the light emitting element 1411 is located on one side and the light emitting elements 1412 and 1413 are located on the other side with the light receiving element 1421 interposed therebetween in the direction perpendicular to the conveyance direction of the recording medium S on the substrate surface of the element substrate 1201.

Figure 24C:
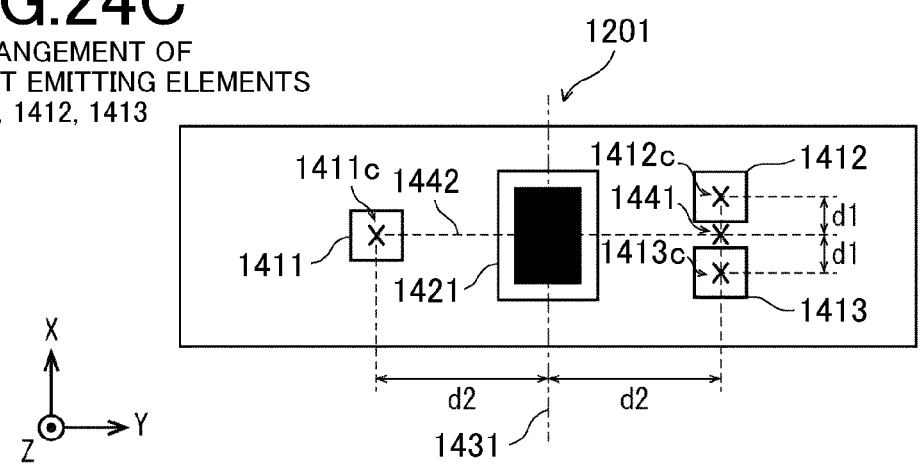
FIG. 24C is a plan view describing a positional relationship between light emitting elements and a light receiving element on the element substrate.

In other words, the light emitting element 1411 and the light emitting elements 1412, 1413 are disposed with the light receiving element 1421 interposed therebetween, and an angle formed by the direction in which the light emitting element 1411 and the light emitting elements 1412, 1413 are aligned (an arrangement direction; more specifically, a direction of a line 1442 in FIG. 24C) with respect to the recording medium conveyance direction is substantially 90 degrees.

The recording medium being conveyed is likely to rotate about the conveyance width direction perpendicular to conveyance direction. In a case in which such rotation of the recording medium occurs, the light emitting elements 1411, 1412, and 1413 are likely to vary in distance from the recording medium if the light emitting elements 1411, 1412, and 1413 are located at different positions in the recording medium conveyance direction.

In this respect, it is desirable to locate the light emitting elements 1411, 1412, and 1413 at the same position in the recording medium conveyance direction where possible. It is therefore desirable that an angle formed by the direction in which the light emitting element 1411 and the light emitting elements 1412, 1413 are aligned (arrangement direction) with respect to the recording medium conveyance direction be substantially 90 degrees.

As shown in FIG. 24C, centers 1412c and 1413c of light emitting regions of the respective light emitting elements 1412 and 1413 (hereinafter simply referred to as "the centers of the light emitting elements 1412 and 1413"; the same applies to other light emitting elements) are aligned in the conveyance direction of the recording medium S (the x direction) in a plan view as seen in the z direction. In other words, the centers 1412c and 1413c of the light emitting elements 1412 and 1413 are located at the same position in the direction (the y direction) perpendicular to the conveyance direction of the recording medium S.

The line 1442 connecting a geometric center 1441 of the centers 1412c and 1413c of the light emitting elements 1412 and 1413 and a center 1411c of the light emitting element 1411 is directed to the direction (the y direction) perpendicular to the conveyance direction of the recording medium S. In other words, the geometric center 1441 and the center 1411c of the light emitting element 1411 are located at the same position in the conveyance direction of the recording medium S (the x direction).

The recording medium S differs in reflection property for each wavelength of light depending on the type. Paying attention to this point, in the present embodiment, the light emitting elements 1411, 1412, and 1413 are caused to emit light (inspection light) having wavelengths different from each other, and the light receiving element 1421 is caused to receive reflected light from the recording medium to detect the amount of reflected light.

As compared with significant variation in the amount of transmitted light through the recording medium depending on the basis weight of the recording medium, the amount of reflected light from the recording medium is less likely to be influenced by the basis weight of the recording medium. In other words, the amount of reflected light from the recording medium is highly sensitive to properties other than the basis weight of the recording medium. Thus, in a case of intending to detect a property other than the basis weight of the recording medium, it is effective to use the amount of reflected light from the recording medium.

The transmitted light through the recording medium is influenced by properties in the recording medium while being transmitted in a scattered manner in the recording medium. Therefore, the amount of transmitted light through the recording medium has a characteristic of containing a large amount of information about internal properties of the recording medium.

If all of the light emitting elements 1411, 1412, and 1413 and the light receiving element 1421 are mounted on the element substrate 1201, the configuration of the medium inspection unit 1200 is simplified, and a relative positional accuracy between the light emitting elements 1411, 1412, 1413 and the light receiving element 1421 is improved.

Configuration of Controller 1101

Concerning the determination of the type of the recording medium, the controller 1101 controls the light emitting elements 1411, 1412, and 1413 on the element substrate 1201 to emit light, and refers to a detection signal indexing the amount of light received by the light receiving element 1421 to determine the type of the recording medium.

Figure 25:
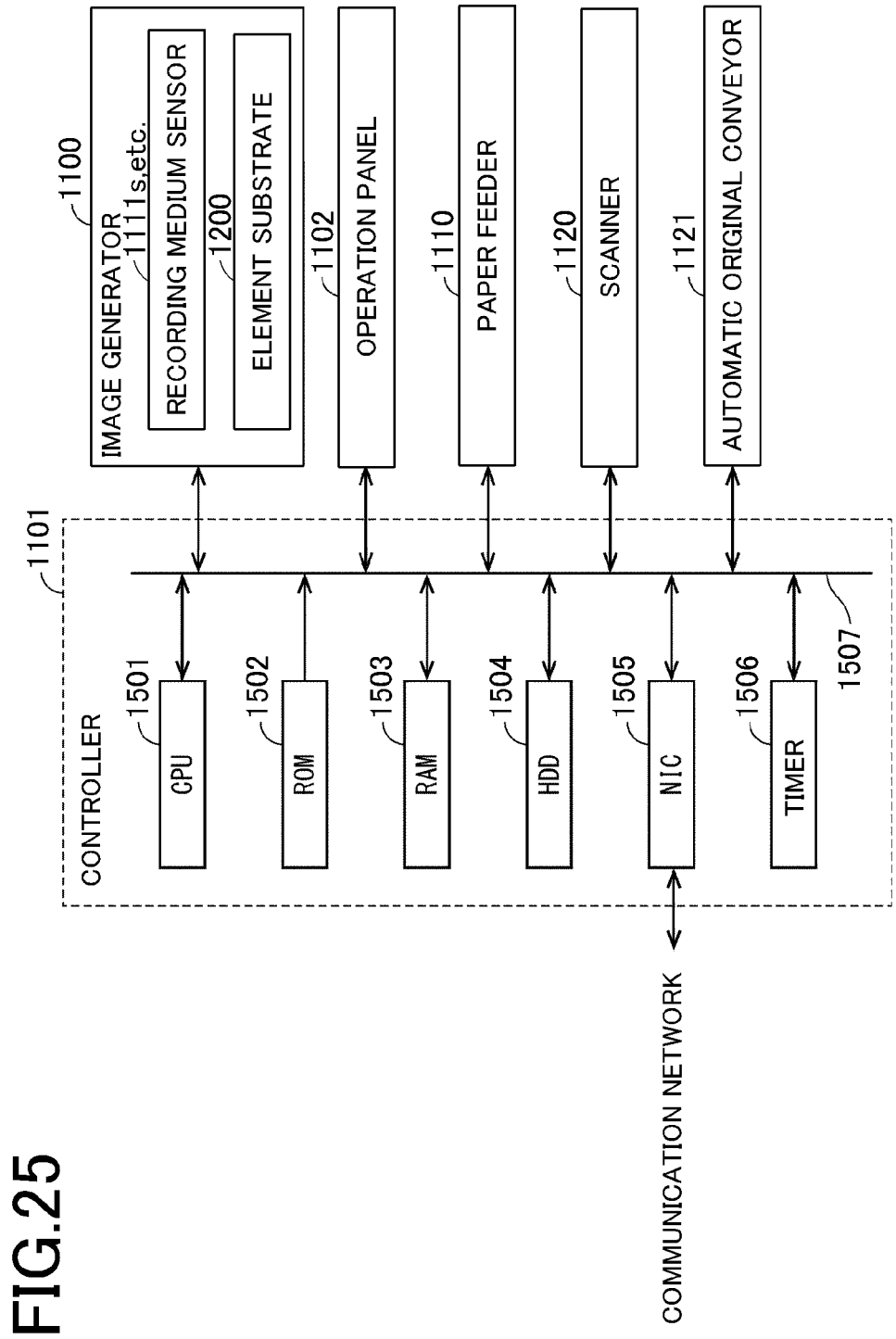
FIG. 25 is a block diagram showing essential components of a controller 1101.

As shown in FIG. 25, the controller 1101 includes a central processing unit (CPU) 1501, a read only memory (ROM) 1502, a random access memory (RAM) 1503, and the like. When reset by turn-on or the like of the image formation device 1, the CPU 1501 reads out a boot program from the ROM 1502 to be activated, and executes an operating system (OS) and various control programs read out from a hard disk drive (HDD) 1504 using the RAM 1503 as a working memory area.

A network interface card (NIC) 1505 executes processing for communicating with another device via a communication network such as a local area network (LAN) or the Internet. An image forming job or the like is thereby received from the other device.

A timer 1506 is used for the controller 1101 to measure an elapsed time and to indicate that a desired timing has arrived. For example, the timer 1506 is used for indicating, to the CPU 1501, a timing for causing the light emitting elements 1411, 1412, and 1413 of the element substrate 1201 to emit light.

The CPU 1501, the ROM 1502, the RAM 1503, the HDD 1504, the NIC 1505, and the timer 1506 are connected to each other with an internal bus 1507 for mutual communication. The image generator 1100 including the element substrate 1201, the operation panel 1102, the paper feeder 1110, the scanner 1120, and the automatic original conveyor 1121 are connected to the controller 1101.

When the CPU 1501 executes a control program or the like, the controller 1101 controls and monitors operations of the image generator 1100, the operation panel 1102, the paper feeder 1110, the scanner 1120, and the automatic original conveyor 1121.

As will be described later, the CPU 1501 refers to detection signals of the recording medium sensors 1111s, 1112s, 1113s, 1114s, and 1115s to detect a conveyance timing of the recording medium. The CPU 1501 inputs a control signal to the element substrate 1201 to control turn-on/off of the light emitting elements 1411, 1412, and 1413, and refers to a detection signal indexing the amount of light received by the light receiving element 1421.

Processing of Determining Type of Recording Medium

Processing of determining the type of a recording medium performed by the image formation device 1000 will now be described.

Upon receipt of a user instruction through the operation panel 1102 or an image forming job from another device via a communication network, the image formation device 1000 executes image forming processing.

When executing the image forming processing, the image formation device 1000 determines the type of a recording medium supplied from the paper feeder 1110 before reaching the resist roller 1211 so as to appropriately set the image forming conditions.

In a case of forming images on a plurality of pages, the type of a recording medium of a leading page alone may be determined, and an image may be formed assuming that subsequent recording media are of the same type as the leading recording medium. Alternatively, the type of all recording media may be determined.

Figure 26:
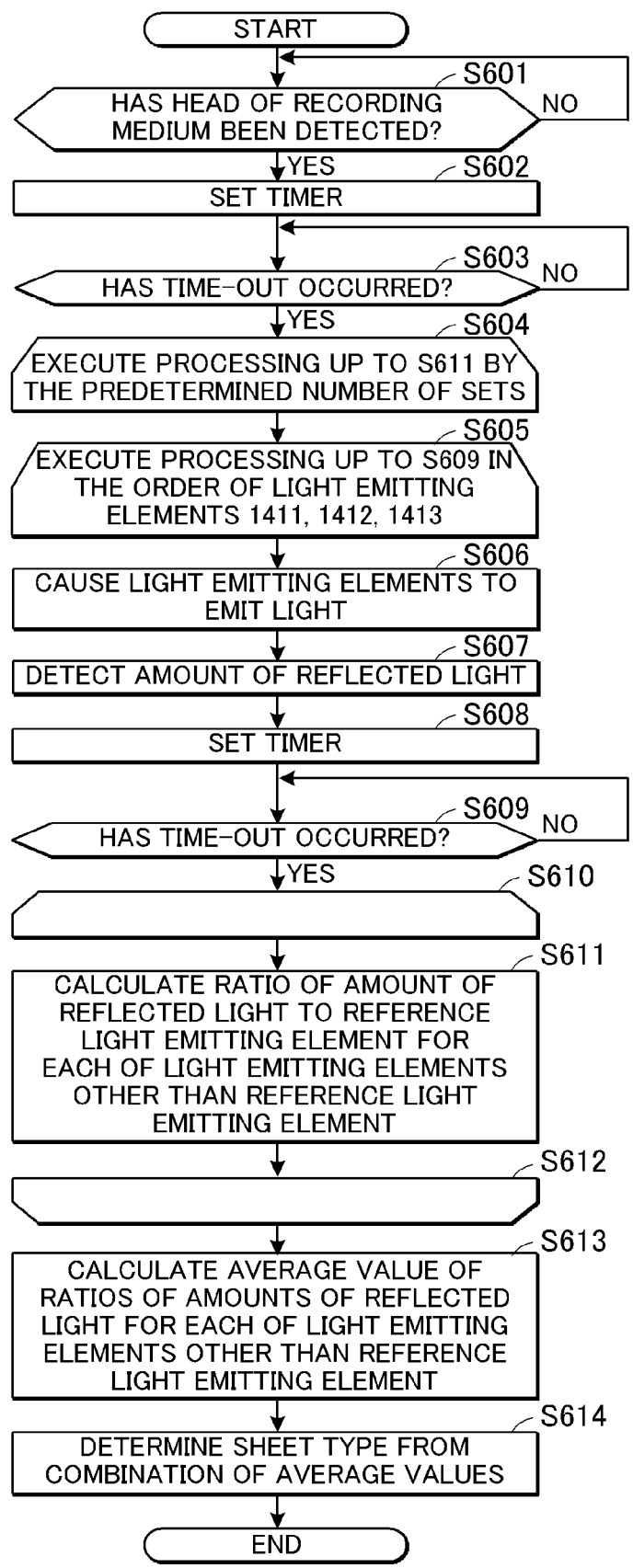
FIG. 26 is a flowchart describing an operation for reducing an influence exerted by positional variation of a recording medium when the controller 1101 determines the type of a recording medium.

As shown in FIG. 26, if the recording medium sensor 1111s, 1112s, 1113s, 1114s, or 1115s detects the head of a recording medium (S601), the controller 1101 sets, in the timer 1506, a conveyance time previously set in accordance with the recording medium sensor having detected the recording medium (S602).

This conveyance time is a time required from when the recording medium sensor detects the head of the recording medium to when the recording medium reaches the inside of a range of light emitted from the light emitting elements 1411, 1412, and 1413 of the element substrate 1201.

Thereafter, when time-out of the timer 1506 occurs, the controller 1101 repeats processing of steps S605 to S611 by a predetermined number of sets. This is to improve the accuracy of determining the type of the recording medium by performing averaging processing as will be described later.

In the processing for each set, processing of steps S606 to S609 is first executed for each of the light emitting elements 1411, 1412, and 1413 in this order.

In other words, as to the light emitting element 1411, the light emitting element 1411 is first caused to emit light toward the recording medium (S606), and the amount of reflected light from the recording medium is detected by the light receiving element 1421 (S607).

Thereafter, the time until the next light emitting element 1412 is caused to emit light is set in the timer 1506 (S608).

It is desirable to set a time interval at which the light emitting elements 1411, 1412, and 1413 are caused to emit light at less than or equal to ten milliseconds. The relative positions of the element substrate 1201 and the recording medium continuously change. Thus, as the light emission interval is shorter, the relative positions of one of the light emitting elements caused to emit light before the lapse of the light emission interval and another one of the light emitting elements caused to emit light after the lapse of the light emission interval with respect to the recording medium are brought closer.

Therefore, the influence exerted by positional variation of the recording medium is reduced. By setting the time interval at which the light emitting elements are caused to emit light at less than or equal to ten milliseconds also in an embodiment which will be described later, similar effects are obtained.

However, a time of several milliseconds is required from when a light emitting element starts emitting light to when the amount of emitted light is stabilized. Obviously, in order to detect the amount of reflected light with high accuracy, it is necessary to wait for stabilization of the amount of emitted light from the light emitting element.

Thus, the light emission interval needs to be more than or equal to several milliseconds in accordance with the properties of the light emitting elements. The same applies to another embodiment.

The time interval between sets may be longer than ten milliseconds. For example, the time interval between sets may be set in agreement with the conveyance speed of the recording medium.

When time-out occurs in the timer 1506 (YES in S609), the process proceeds into step S606 to cause the light emitting element 1412 to emit light. Processing as described above is also executed for the light emitting elements 1412 and 1413 similarly to the light emitting element 1411.

It is needless to say that only one of the light emitting elements 1411, 1412, and 1413 is turned on (emits light) at a time, and the other light emitting elements are turned off at that time. Similarly, two or more of the light emitting elements are not caused to emit light at the same time in another embodiment as well.

Thereafter, the ratio of the amount of reflected light to the light emitting element 1412 used as a reference light emitting element is calculated for each of the light emitting elements other than the reference light emitting element (S611). For example, a value obtained by dividing the amount of reflected light detected using the light emitting element 1411 by the amount of reflected light detected using the light emitting element 1412 is the ratio of the amount of reflected light of the light emitting element 1411.

The ratio of the amount of reflected light is also calculated similarly for the light emitting element 1413. The ratio of the amount of reflected light of the reference light emitting element 1412 is always one, and therefore does not need to be calculated.

When the ratio of the amount of reflected light is calculated, the process proceeds into step S605, and processing for the next set is executed.

When processing for all the sets is completed, an average value of the ratios of the amounts of reflected light is calculated for each of the light emitting elements other than the reference light emitting element (S613). By executing the processing of steps S604 to S612, the ratios of the amounts of reflected light are obtained by the number of sets for each of the light emitting elements. Thus, by calculating the total value of the ratios of the amounts of reflected light by the number of sets and dividing the total value by the number of sets, an average value of the ratios of the amounts of reflected light for each of the light emitting elements other than the reference light emitting element is obtained.

It is considered that the reflection property of the recording medium is not necessarily completely uniform across the entire surface of the recording medium, but may vary within a predetermined allowable range. In order to prevent the accuracy of determining the type of the recording medium from degrading due to such variation in reflection property, it is effective to detect the amounts of reflected light at a plurality of positions within the plane of the recording medium, and define their average value as the reflection property of the recording medium.

For detecting the amounts of reflected light at a plurality of positions within the plane of the recording medium, the amounts of reflected light may be detected at a plurality of timings while conveying the recording medium. The position on the recording medium at which light emitted from a light emitting element enters differs when the timing is different. The amounts of reflected light are thereby detected at a plurality of positions.

The amount of reflected light may vary depending on the position of the recording medium. Thus, when the total value of the amounts of reflected light is calculated for each of the light emitting elements, and then the ratio of the amount of reflected light is calculated using this total value, a detected value obtained when the distance from a light emitting element to the recording medium is smaller and therefore the amount of reflected light is larger contributes to the total value at a greater degree.

A detected value obtained when the distance from a light emitting element to the recording medium is larger and the amount of reflected light is smaller contributes to the total value at a smaller degree. Thus, an influence exerted by variation in the reflection property of the recording medium is not necessarily reduced effectively.

If the ratios of the amounts of reflected light are calculated for the respective sets, and then their average value is calculated, an influence exerted by variation in the distance from a light emitting element to the recording medium is reduced by calculating the ratio of the amount of reflected light. Thus, the influence exerted by variation in the reflection property of the recording medium is effectively reduced.

The type of the recording medium is determined from a combination of average values of the ratios of the amounts of reflected light for the respective light emitting elements, and the process is terminated (S614).

For determining the type of the recording medium, a table may be used in which a combination of ranges of ratios of the amounts of reflected light for the respective light emitting elements is associated with the type of a recording medium as in FIG. 27, for example. The type of the recording medium is determined depending on to which column in the table of FIG. 27 a combination of the average values of the ratios of the amounts of reflected light calculated in step S613 corresponds.

How to Select Reference Light Emitting Element

In the present embodiment, the light emitting element 1412 to be caused to emit light second among the three light emitting elements 1411, 1412, and 1413 is used as the reference light emitting element (a light emitting element that emits the first inspection light) to reduce the influence exerted by positional variation of the recording medium and to improve the accuracy of determining the type of the recording medium.

Figure 28A:
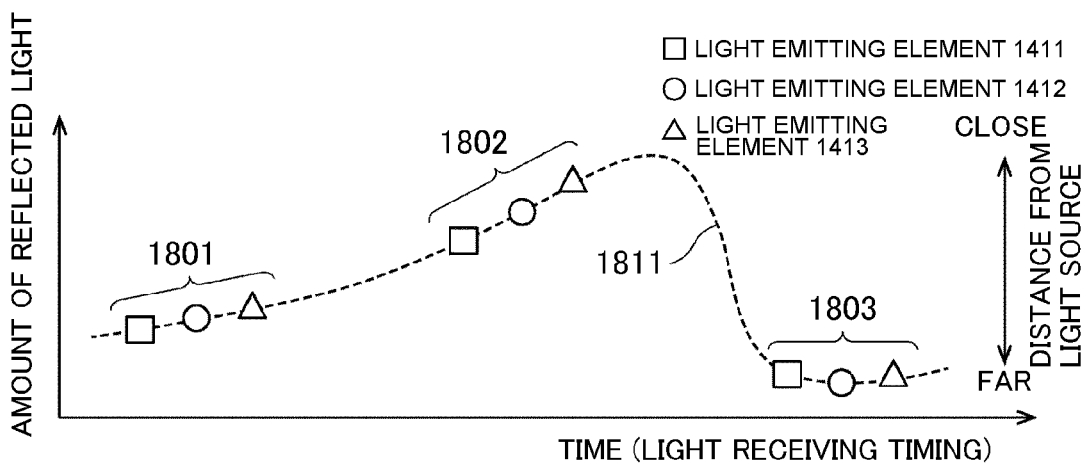
FIG. 28A is a graph illustrating three sets of a relationship between a position of a recording medium and an amount of reflected light detected for each of light emitting elements.

As illustrated in FIG. 28A, for example, in a case in which the position of the recording medium at a position detected by the element substrate 1201 varies like a broken line 1811, the amount of reflected light shall be detected as indicated by sets 1801, 1802, and 1803.

FIG. 28A illustrates a case of using a recording medium of a type that, if the position of the recording medium is the same, the amounts of reflected light detected for the light emitting elements 1411, 1412, and 1413 also have values close to each other.

In the present embodiment, the type of the recording medium is determined utilizing the fact that the amounts of reflected light vary among the light emitting elements 1411, 1412, and 1413 depending on the type of the recording medium.

Thus, the amounts of reflected light detected for the light emitting elements 1411, 1412, and 1413 may obviously have values different from each other depending on the type of the recording medium even if the position of the recording medium is the same for the light emitting elements 1411, 1412, and 1413. Even in such a case, the effect of using the light emitting element 1412 as the reference light emitting element is the same.

Figure 28B:
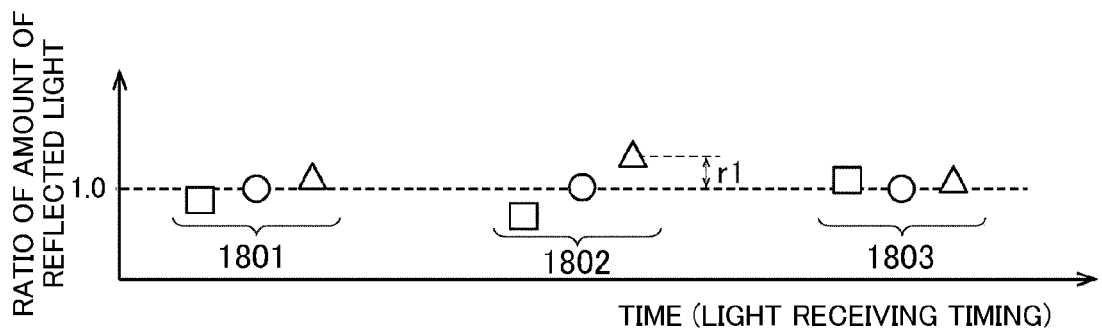
FIG. 28B is a diagram illustrating ratios of the amounts of reflected light in a case of using a light emitting element as a reference light emitting element in correspondence with FIG. 28A.

In a case as shown in FIG. 28A, when the ratio of the amount of reflected light is calculated using, as the reference light emitting element, the light emitting element 1412 to be caused to emit light second, in other words, in the middle of the sequence of light emission among the three light emitting elements 1411, 1412, and 1413, a result as shown in FIG. 28B is obtained. Even in the set 1802 in which positional variation of the recording medium is the largest among the light emitting elements, the difference in the ratio of the amount of reflected light stays at r1 as compared with the set 1803 in which positional variation of the recording medium is the smallest.

Figure 28C:
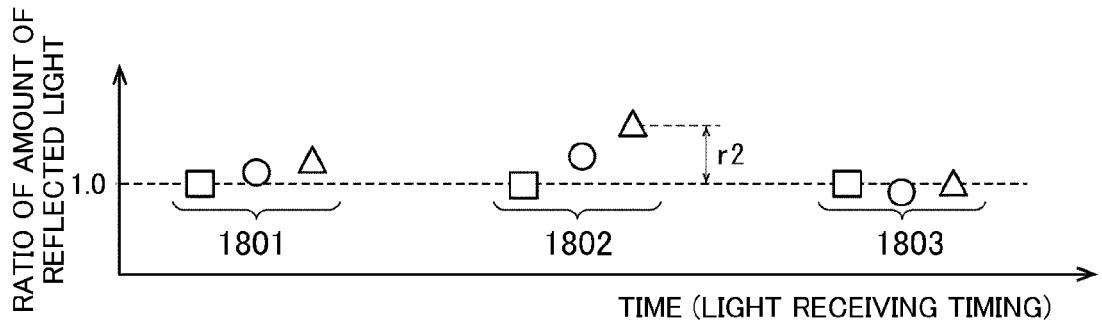
FIG. 28C is a diagram illustrating ratios of the amounts of reflected light in the case of using a light emitting element as the reference light emitting element in correspondence with FIG. 28A.

When the light emitting element 1411 to be caused to emit light first is used as the reference light emitting element, the difference in the ratio of the amount of reflected light in the set 1802 is increased to r2 as shown in FIG. 28C.

In this manner, the influence exerted by positional variation of the recording medium is reduced by causing the light emitting element close to the middle of the sequence of light emission to emit light. The accuracy of determining the type of the recording medium is thereby maximized. Toward both ends from the middle of the sequence of light emission, the influence exerted by positional variation of the recording medium increases.

In this manner, by using a light emitting element other than those at both the ends in the sequence of light emission as the reference light emitting element, the influence exerted by positional variation of the recording medium is smaller than in a case of using either of the light emitting elements at both the ends as the reference light emitting element. Thus, the accuracy of determining the type of the recording medium is improved.

In the present embodiment, the light emitting element 1411 is disposed on one side and the light emitting elements 1412 and 1413 are disposed on the other side with the light receiving element 1421 interposed therebetween in the direction perpendicular to the recording medium conveyance direction, and the light emitting element 1412 is used as the reference light emitting element. In other words, a single light emitting element is disposed on one side of the light receiving element 1421, and two light emitting elements are disposed on the other side.

In this manner, when an odd number of light emitting elements are separated into two groups (hereinafter referred to as "light emitting element groups") and disposed on both the sides of the light receiving element 1421, the number of light emitting elements constituting one of the light emitting element groups is always larger than the number of light emitting elements constituting the other one of the light emitting element groups.

In such a case, it is desirable to use a light emitting element included in the light emitting element group having a larger number of light emitting elements as the reference light emitting element. As described above, the position of the recording medium changes continuously. Thus, a light emitting element disposed at a position close to the reference light emitting element and the reference light emitting element are substantially equidistant from the recording medium, and the ratio of the amount of reflected light to the reference light emitting element is easily stabilized.

Therefore, as the number of light emitting elements disposed on the same side as the reference light emitting element with respect to the light receiving element is larger, the number of light emitting elements in which the ratio of the amount of reflected light to the reference light emitting element is easily stabilized is larger. Thus, the determination accuracy increases in a case of determining the type of the recording medium using a combination of the ratios of the amounts of reflected light.

Wavelengths of Light Emitted from Light Emitting Elements 1411, 1412, and 1413

Although it is needless to say that light emitted from the light emitting elements 1411, 1412, and 1413 desirably has a wavelength suitable for determining the type of the recording medium, the following is desirable considering reduction of the influence exerted by positional variation of the recording medium.

It is desirable that the reflected amount of light (the first inspection light) emitted from the reference light emitting element truly reflect positional variation of the recording medium without being influenced by the type of the recording medium. This is because such a configuration enables only the influence exerted by positional variation of the recording medium to be eliminated from the amounts of reflected light concerning the other light emitting elements.

Light having a wavelength shorter than 750 nm is absorbed depending on the color of the recording medium in accordance with the wavelength, and the amount of reflected light may vary. Light having a wavelength longer than 1100 nm is absorbed by the water content contained in the recording medium, and the amount of reflected light may vary. Neither case is preferable.

In this respect, it is desirable that the wavelength of light emitted from the reference light emitting element be more than or equal to 750 nm and less than or equal to 1100 nm.

Considering more precisely, even in a wavelength region from 750 nm to 850 nm, the color of the recording medium might influence the amount of reflected light. Depending on the light receiving element 1421, the sensitivity may degrade in a wavelength region exceeding 950 nm.

Considering even those circumstances, it is more desirable that the wavelength of light emitted from the reference light emitting element be more than or equal to 850 nm and less than or equal to 950 nm.

Even if the light emitting element emits light having a wavelength outside the above-described wavelength region, the influence exerted by positional variation of the recording medium is effectively reduced under a circumstance such as limitation on the type of a recording medium to be determined or usage in a dry environment.

Even in a case in which there is no such circumstance, it is needless to say that the influence exerted by positional variation of the recording medium is reduced to some degree.

The wavelength of light (the second inspection light) emitted from a light emitting element other than the reference light emitting element may be selected depending on the type of the recording medium that the image formation device 1 uses for image formation. Examples of such a recording medium include colored paper, recycled paper, coated paper, and the like.

Colored paper is a recording medium that contains a color material. Recycled paper is a recording medium that contains recycled pulp. Coated paper is a recording medium with a coating layer provided on its surface.

Wavelength dependency of absorption and scattering of light having entered these recording media is seen in a wavelength region shorter than 750 nm. Thus, it is desirable that the wavelength of light emitted from a light emitting element other than the reference light emitting element be shorter than the wavelength of light emitted from the reference light emitting element.

Third Embodiment

The image formation device 1000 according to a third embodiment has a configuration substantially common to that of the image formation device 1000 according to the above-described second embodiment, but is different in that the type of a recording medium is determined by detecting the amount of transmitted light through the recording medium using four light emitting elements that emit light having wavelengths different from each other.

Hereinafter, description will be provided mainly paying attention to the different point. In the present embodiment, common members are denoted by common reference characters.

Figure 29A:
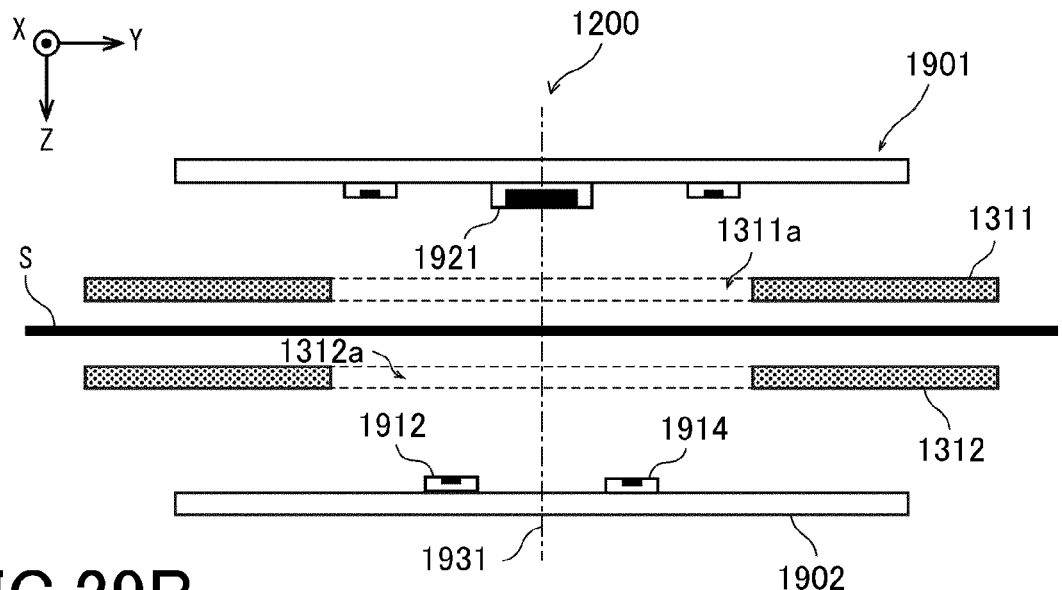
FIG. 29A is a diagram related to a third embodiment of the present disclosure, which is a diagram of essential components of a medium inspection unit as seen in the recording medium conveyance direction.

As shown in FIG. 29A, in the medium inspection unit 1200 according to the present embodiment, a first element substrate 1901 and a second element substrate 1902 are disposed instead of the element substrate 1201 and the reflection-purpose reference plate 1202 according to the above-described second embodiment.

Figure 29B:
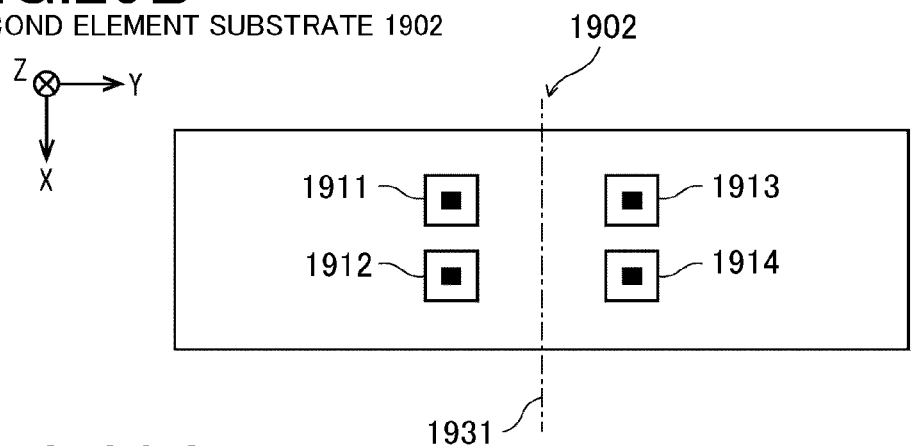
FIG. 29B is a diagram related to the third embodiment of the present disclosure, which is a plan view showing a configuration of a second element substrate.

A light receiving element 1921 is mounted on the first element substrate 1901, while no light emitting element is mounted. As shown in FIG. 29B, four light emitting elements 1911, 1912, 1913, and 1914 are mounted on the second element substrate 1902. The light emitting elements 1911, 1912, 1913, and 1914 are one mode of the light emitter. The light receiving element 1921 is one mode of the light detector.

When the recording medium S passes between the guide plates 1311 and 1312, the light emitting elements 1911, 1912, 1913, and 1914 emit light in sequence, and the light receiving element 1921 detects the amount of transmitted light through the recording medium S.

In the present embodiment, there are four light emitting elements, and no light emitting element emits light just in the middle of the sequence of light emission of the light emitting elements. Thus, a light emitting element to be caused to emit light second or third that is the closest to the middle of the sequence of light emission is used as the reference light emitting element.

In general, in a case in which the number of light emitting elements is even (denoted as 2N), effects similar to those of the above-described second embodiment are obtained if the N- or N+1-th light emitting element in the sequence of light emission is used as the reference light emitting element.

Figure 29C:
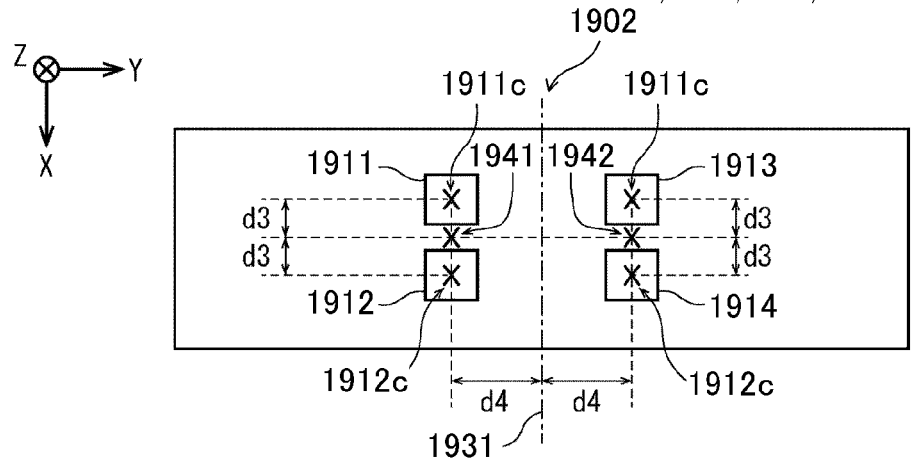
FIG. 29C is a diagram related to the third embodiment of the present disclosure, which is a plan view describing a positional relationship between light emitting elements on the second element substrate.

In order to prevent the position at which light emitted from the light emitting elements 1911, 1912, 1913, and 1914 is transmitted from being varied on the recording medium where possible, it is desirable that the number of light emitting elements constituting each of two light emitting element groups with the light receiving element 1921 interposed therebetween be the same number in the direction (the y direction) perpendicular to the recording medium conveyance direction as shown in FIG. 29C.

In order to prevent the light emitting element groups from being misaligned from each other in the recording medium conveyance direction (the x direction), the light emitting elements 1911, 1912, 1913, and 1914 are disposed such that a line 1943 connecting a geometric center 1941 between centers 1911c and 1912c of the light emitting elements 1911 and 1912 and a geometric center 1942 between centers 1913c and 1914c of the light emitting elements 1913 and 1914 passes through substantially the center of a light receiving region of the light receiving element 1921 and is perpendicular to the recording medium conveyance direction.

In other words, the geometric centers of the centers of the light emitting elements 1911, 1912, 1913, and 1914 substantially agree with the center of the light receiving region of the light receiving element 1921.

With such a configuration, a light emitting element on either side of the light receiving element 1921 enables variation in the amount of transmitted light due to positional variation of the recording medium to be eliminated with high accuracy since the position of the recording medium varies in the conveyance direction in many cases.

Fourth Embodiment

The image formation device 1 according to a fourth embodiment has a configuration substantially common to that of the image formation device 1000 according to the above-described second and third embodiments, but is different in that the type of a recording medium is determined by detecting the amount of reflected light from the recording medium using five light emitting elements that emit light having wavelengths different from each other, and detecting the amount of transmitted light through the recording medium further using another light emitting element.

Figure 30A:
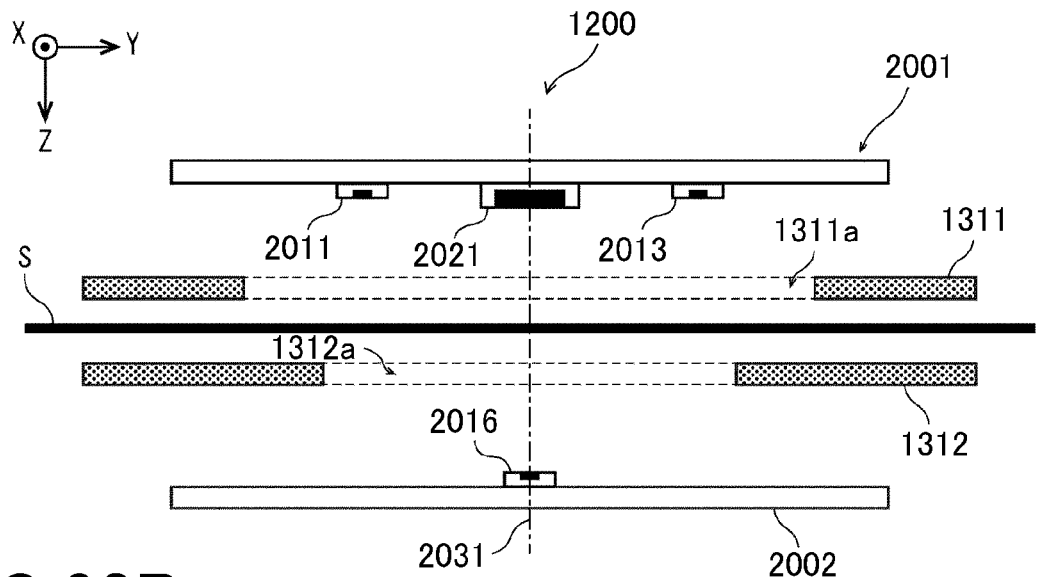
FIG. 30A is a diagram related to a fourth embodiment of the present disclosure, which is a diagram of essential components of a medium inspection unit as seen in the recording medium conveyance direction.
Figure 30B:
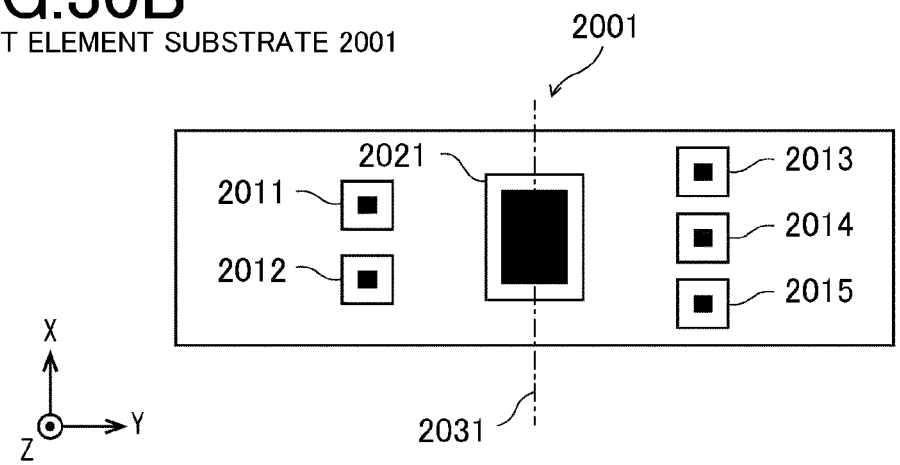
FIG. 30B is a diagram related to the fourth embodiment of the present disclosure, which is a plan view showing a positional relationship between light emitting elements and a light receiving element on a first element substrate.
Figure 30C:
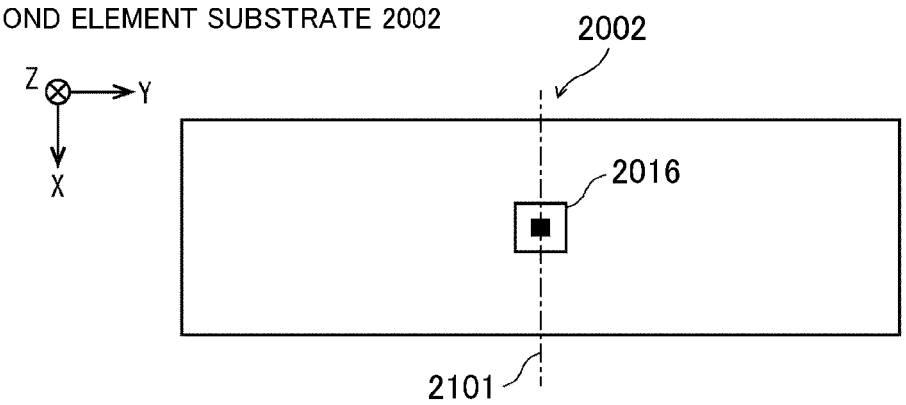
FIG. 30C is a diagram related to the fourth embodiment of the present disclosure, which is a plan view describing an arrangement of a light emitting element on a second element substrate.

As shown in FIG. 30A, the medium inspection unit 1200 according to the present embodiment includes a first element substrate 2001 and a second element substrate 2002 similarly to the medium inspection unit 1200 according to the above-described third embodiment. An odd number of light emitting elements are mounted on the first element substrate 2001 similarly to the element substrate 1201 according to the above-described second embodiment.

The number of light emitting elements mounted on the first element substrate 2001 is five. The five light emitting elements are divided into a light emitting element group composed of two light emitting elements 2011 and 2012 and a light emitting element group composed of three light emitting elements 2013, 2014, and 2015, and are disposed such that a light receiving element 2021 is interposed therebetween in the recording medium conveyance direction. The light emitting elements 2011, 2012, 2013, 2014, and 2015 and a light emitting element 2016 mounted on the second element substrate 2002 are one mode of the light emitter. The light receiving element 2021 is one mode of the light detector.

As described above, when the reference light emitting element is selected from one of the light emitting element groups that has a larger number of light emitting elements, the accuracy of determining the recording medium is improved. Furthermore, in the present embodiment, the one of the light emitting element groups that has a larger number of light emitting elements is composed of the three light emitting elements 2013, 2014, and 2015, and the light emitting elements 2013, 2014, and 2015 are linearly aligned in the recording medium conveyance direction.

Thus, a difference in the influence exerted by positional variation of the recording medium between the light emitting element 2014 at the center and the other two light emitting elements 2013 and 2015 is likely to be smaller than the difference between the light emitting elements 2013 and 2015 at both the ends of the array. Thus, in the present embodiment, the light emitting element 2014 is used as the reference light emitting element.

The amount of reflected light concerning the reflection-purpose light emitting elements 2011, 2012, 2013, 2014, and 2015 and the amount of transmitted light concerning the transmission-purpose light emitting element 2016 are different in the manner influenced by positional variation of the recording medium. Thus, in the present embodiment, the influence exerted by positional variation of the recording medium is eliminated only for the amount of reflected light concerning the reflection-purpose light emitting elements 2011, 2012, 2013, 2014, and 2015.

In other words, the reflection-purpose light emitting elements 2011, 2012, 2013, 2014, and 2015 are turned on in sequence to detect the amount of reflected light, respectively. Since the number of the reflection-purpose light emitting elements 2011, 2012, 2013, 2014, and 2015 is odd, the reference light emitting element 2014 is caused to emit light in the middle (third), and the ratio of the amount of reflected light concerning each of the other light emitting elements to the detected amount of reflected light is calculated.

A line connecting a geometric center of the centers of the light emitting elements 2011 and 2012 and a geometric center of the centers of the light emitting elements 2013, 2014, and 2015 passes through substantially the center of a light receiving region of the light receiving element 2021, and is perpendicular to the recording medium conveyance direction.

The light emitting element 2016 is mounted on the second element substrate 2002 at a position opposite to the light receiving element 2021.

The reflection-purpose light emitting elements 2011, 2012, 2013, 2014, and 2015 emit light having wavelengths different from each other. The wavelength of light emitted from the transmission-purpose light emitting element 2016 may be the same as the wavelength of light emitted from any of the reflection-purpose light emitting elements 2011, 2012, 2013, 2014, and 2015, or may be different from the wavelengths of light emitted from all of the reflection-purpose light emitting elements 2011, 2012, 2013, 2014, and 2015.

The class of the recording medium is determined using the ratios of the amounts of reflected light concerning the reflection-purpose light emitting elements 2011, 2012, 2013, 2014, and 2015 and the amount of transmitted light concerning the transmission-purpose light emitting element 2016. This amount of transmitted light indexes the basis weight of the recording medium.

In a case of calculating the basis weight from the amount of transmitted light, the amount of transmitted light in a case in which there is no recording medium may be detected previously, and a ratio of the amount of transmitted light in a case in which there is a recording medium to the amount of transmitted light in the case in which there is no recording medium may be calculated to specify the basis weight of the recording medium using the ratio of the amount of transmitted light.

As to the amounts of reflected light in the case of using the reflection-purpose light emitting elements 2011, 2012, 2013, 2014, and 2015, it may be configured such that the second element substrate 2002 and the reflection-purpose reference plate are switched, and the amount of reflected light in a case in which there is no recording medium may be detected, thereby correcting the amount of reflected light in the case in which there is a recording medium.

Similarly to the above-described second embodiment, the amount of light emitted from the light emitting elements 2011, 2012, 2013, 2014, and 2015 may be adjusted such that the amounts of reflected light concerning the light emitting elements 2011, 2012, 2013, 2014, and 2015 become a predetermined amount of light in the case in which there is no recording medium.

Such a configuration reduces the influence on the amount of transmitted light exerted by individual differences as components and temporal changes of the light emitting elements 2011, 2012, 2013, 2014, 2015, and 2016 and the light receiving element 2021.

Fifth Embodiment

A fifth embodiment relates to a recording medium determination device only dedicated to determining the type of a recording medium.

Figure 31A:
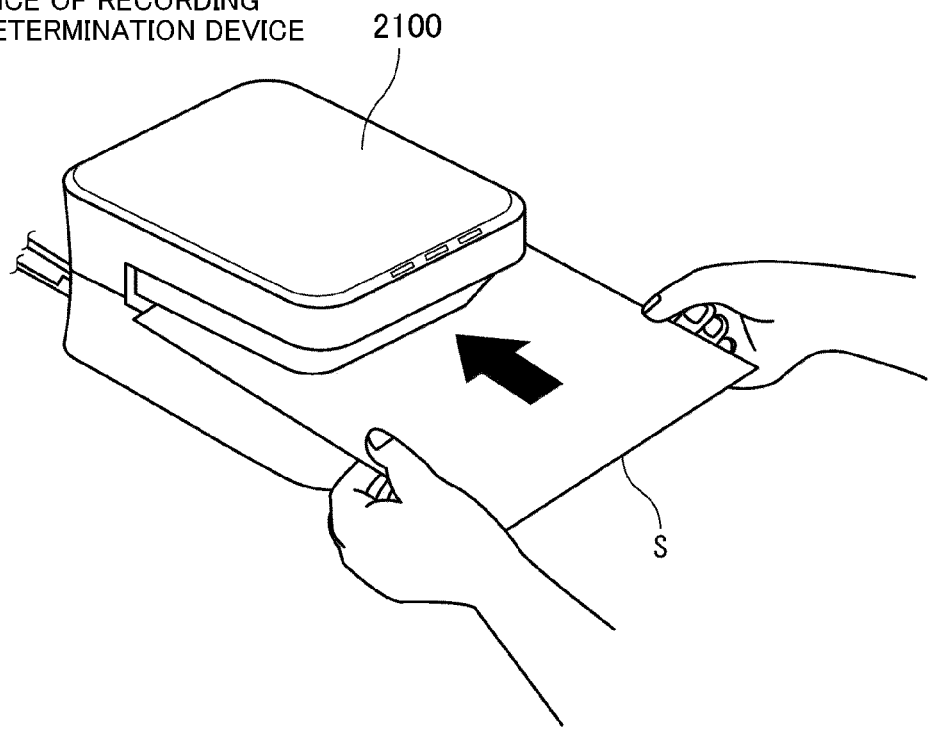
FIG. 31A is a perspective appearance diagram illustrating a usage state of a recording medium determination device according to a fifth embodiment of the present disclosure.

When the recording medium S is inserted into the device by a hand operation as shown in FIG. 31A, a recording medium determination device 2100 according to the present embodiment determines the type of the inserted recording medium.

A mechanism may be provided in which a tray on which a bundle of recording media is to be placed is provided, recording media are supplied from the tray one by one into the recording medium determination device 2100, and when the type of a recording medium is determined, the determined recording medium is discharged, and the next recording medium is supplied.

Figure 31B:
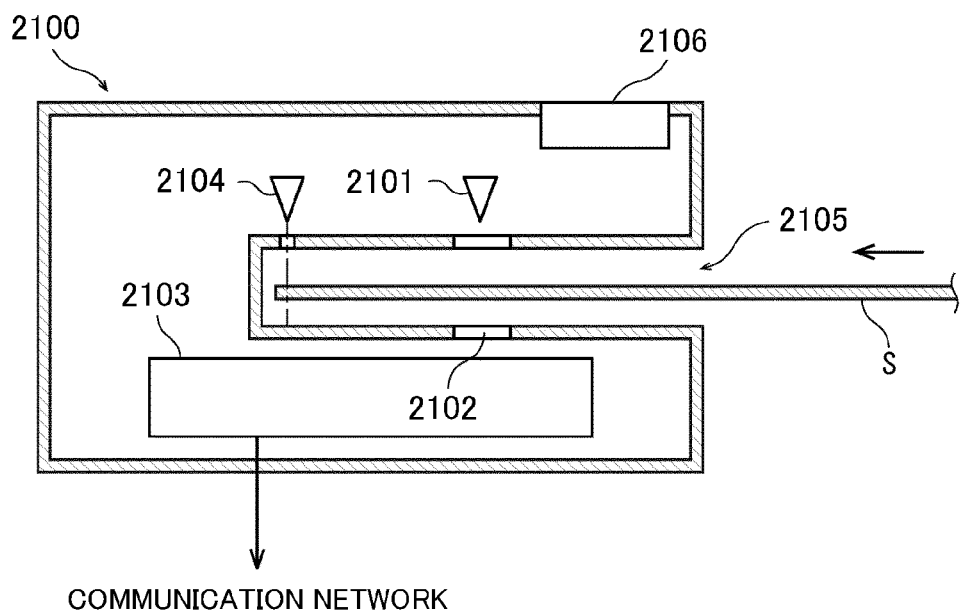
FIG. 31B is a diagram describing essential components of the recording medium determination device according to the fifth embodiment of the present disclosure.

Description is provided citing, as an example, a case in which the recording medium determination device 2100 includes the medium inspection unit 1200 according to the second embodiment. As shown in FIG. 31B, the recording medium determination device 2100 is provided with an internal space 2105 into which the recording medium S is to be inserted, and an element substrate 2101 is disposed above the recording medium S inserted into the internal space 2105. A reflection-purpose reference plate 2102 is disposed below the recording medium S.

On the farther side of the medium inspection unit 1200 in the insertion direction of the recording medium S, a recording medium sensor 2104 that detects the presence/absence of the recording medium S is provided. The recording medium sensor 2104 may be an optical sensor or may be a mechanical sensor, and the method of detecting the recording medium is not limited.

The recording medium sensor 2104 is provided on the farther side of the medium inspection unit 1200 in the insertion direction of the recording medium S. Thus, when the recording medium sensor 2104 detects the recording medium S, the recording medium S has already entered between the element substrate 2101 and the reflection-purpose reference plate 2102.

In this state, the element substrate 2101 emits light toward the recording medium S, and detects the amount of reflected light therefrom.

The element substrate 2101 is connected to a controller 2103, and monitored and controlled by the controller 2103. The controller 2103 has a configuration substantially similar to that of the controller 1101 described in the above-described second embodiment.

When controlling the operation of the element substrate 2101 to acquire the amount of reflected light concerning each of the light emitting elements, the controller 2103 calculates the ratio of the amount of reflected light to the amount of reflected light concerning the reference light emitting element, thereby determining the type of the recording medium.

The controller 2103 may display a determination result of the type of the recording medium on a display 2106, or may inform another device (for example, an image formation device) of the determination result via a communication network. The communication network may be a LAN or the Internet, or may be near field communication such as a universal serial bus (USB) or Bluetooth (registered trademark of Bluetooth SIG Inc.).

If the internal space 2105 in the recording medium determination device 2101 is excessively narrow, the recording medium S is likely to jam when manually inserted. This reduces operability of the recording medium determination device 2101.

Thus, the internal space 2105 cannot be made excessively narrow, which makes it difficult to reduce positional variation of the recording medium S in the internal space 2105. By applying the present disclosure to cope with such a problem, the type of the recording medium S is determined with high accuracy even if the position of the recording medium S varies.

Modifications

Although the present disclosure has been described above based on the embodiments, the present disclosure is not limited to the above-described embodiments as a matter of course, and the following modifications can be implemented.

(1) Although the above embodiments have been described citing, as an example, the case of determining the type of a recording medium from a combination of the ratios of the amounts of reflected light concerning the respective light emitting elements, it is needless to say that the present disclosure is not limited thereto. Instead, the type of the recording medium may be determined using a combination of difference values between the amount of reflected light concerning the reference light emitting element and the amount of reflected light concerning each of the other light emitting elements.

In a case in which the influence on the amount of reflected light exerted by positional variation of the recording medium has the same scale factor at wavelengths different from each other, the influence exerted by positional variation of the recording medium is cancelled by taking the ratio of the amount of reflected light. In a case in which the influence on the amount of reflected light exerted by positional variation of the recording medium increases/decreases in a similar manner at wavelengths different from each other, the influence exerted by positional variation of the recording medium is cancelled by taking a difference in the amount of reflected light.

The amount of transmitted light may be detected using three or more light emitting elements that emit light having wavelengths different from each other, and the type of the recording medium may be determined using a combination of relative relationships such as a ratio or a difference value between the amount of transmitted light concerning the reference light emitting element and the amount of transmitted light concerning each of the other light emitting elements.

By detecting the amount of light received from the light emitting elements through the recording medium, such as the amount of reflected light and the amount of transmitted light, and determining the type of the recording medium using a combination of relative relationships between the amount of received light concerning the reference light emitting element and the amount of received light concerning each of the other light emitting elements, the influence exerted by positional variation of the recording medium included in the amounts of received light concerning the other light emitting elements is reduced. Thus, the accuracy of determining the type of the recording medium is improved.

In this case, even if a relative relationship between the amount of received light concerning the reference light emitting element and the amount of received light concerning each of the other light emitting elements is not the ratio of the amount of received light or the difference value, the effects of the present disclosure are obtained as long as the influence exerted by positional variation of the recording medium included in the amounts of received light concerning the other light emitting elements is reduced.

(2) Although the above embodiments have been described citing, as an example, the case of determining the type of the recording medium using an average value in a plurality of sets, it is needless to say that the present disclosure is not limited thereto, and the type of the recording medium may be determined with a single set in a case in which a sufficient determination accuracy is obtained.

Such a configuration enables the time required for determining the type of the recording medium to be shortened. Therefore, in the image formation device, for example, an effect such as improved productivity is obtained.

(3) Although the above embodiments have been described citing, as an example, the case in which the sequence of light emission of the light emitting elements is the same between sets in the plurality of sets, it is needless to say that the present disclosure is not limited thereto. As long as the turn of the reference light emitting element is the same, the sequence of light emission of the other light emitting elements may be different between the sets.

(4) The above embodiments have been described citing, as an example, the case of using a specific light emitting element as the reference light emitting element. However, in a case of changing the sequence of light emission of the light emitting elements between the sets, a light emitting element to emit light in the middle of the sequence is used as the reference light emitting element in a case in which the number of light emitting elements is odd, and the N– or N+1-th light emitting element in the sequence of light emission is used as the reference light emitting element in a case in which the number of light emitting elements is even (2N). The influence exerted by positional variation of the recording medium is thereby reduced to some degree.

(5) Although the above embodiments have been described citing, as an example, the case in which the medium inspection unit is fixed and the position of the recording medium varies, it is needless to say that the present disclosure is not limited thereto. Even in a case in which the medium inspection unit is not fixed, similar effects are obtained by applying the present disclosure in a case in which the relative positional relationship between the medium inspection unit and the recording medium S may vary.

(6) Although the above embodiments have been described citing, as an example, the case in which the image formation device is the tandem color multi-function peripheral, it is needless to say that the present disclosure is not limited thereto. A color multi-function peripheral other than the tandem color multi-function peripheral or a monochrome multi-function peripheral may be adopted.

The image formation device may be a single-function peripheral such as a printer device, a copy device having a scanner function, or a facsimile device having a facsimile function.

The present disclosure is not limited to the electrophotographic image formation device illustrated in the above embodiments, but an image formation device other than the electrophotographic image formation device, such as an ink jet image formation device, may be adopted. In either case, by applying the present disclosure, the accuracy of determining the type of a recording medium is prevented from degrading due to positional variation of the recording medium.

INDUSTRIAL APPLICABILITY

The recording medium determination device, the image formation device, and the recording medium determination method according to the present disclosure are usable as devices that prevent the accuracy of determining the type of a recording medium from degrading even if the relative positional relationship between the light emitting elements, the light receiver, and the recording medium varies.

Although some embodiments of the present invention have been described, the scope of the present invention is not limited to the embodiments described above, and includes the scope of the invention recited in claims and the scope equivalent thereto.

Although embodiments of the present invention have been described and illustrated in detail, the disclosed embodiments are made for purposes of illustration and example only and not limitation. The scope of the present invention should be interpreted by terms of the appended claims

What is claimed is:
1. A recording medium determination device comprising:
a light emitter that emits inspection light to a recording medium;
a light detector that detects incident light including at least one of diffuse reflected light of the inspection light emitted to the recording medium or fluorescent light excited by the inspection light in the recording medium; and
a hardware processor that makes a determination depending on a property of the recording medium based on a detection result of first incident light of the incident light in accordance with first inspection light of the inspection light and second incident light of the incident light in accordance with second inspection light of the inspection light obtained by the light detector,
wherein
the first inspection light has an intensity whose peak wavelength is more than or equal to 750 nm and less than or equal to 1100 nm, and
the second inspection light has an intensity whose peak wavelength is shorter than the peak wavelength of the first inspection light, and wherein
the hardware processor makes the determination depending on the property based on a ratio between a first value in accordance with an amount of the first incident light received by the light detector and a second value in accordance with an amount of the second incident light received by the light detector.

2. The recording medium determination device according to claim 1, wherein the hardware processor makes the determination depending on the property based on a region including coordinates corresponding to the detection result in a plurality of regions previously determined on a coordinate plane obtained by using the first value and the second value as two axes.

3. The recording medium determination device according to claim 1, wherein the second inspection light has an intensity whose peak wavelength is more than or equal to 390 nm and less than or equal to 440 nm.

4. The recording medium determination device according to claim 1, wherein the second inspection light has an intensity whose peak wavelength is more than or equal to 280 nm and less than or equal to 400 nm.

5. The recording medium determination device according to claim 1, wherein the first inspection light has an intensity whose peak wavelength is more than or equal to 800 nm and less than or equal to 900 nm.

6. The recording medium determination device according to claim 1, wherein
the light detector has a light receiving element that detects the incident light, and
the light receiving element is a photodiode or a phototransistor having a detection sensitivity in a wavelength region from a visible wavelength region to a near-infrared wavelength region.

7. The recording medium determination device according to claim 1, further comprising:
a substrate provided at a position opposite to a conveyance path of the recording medium, wherein
the light emitter has a light emitting element that emits the inspection light,
the light detector has a light receiving element that detects the incident light, and
the light emitting element and the light receiving element are provided on the substrate.

8. The recording medium determination device according to claim 1, wherein
the light emitter has a first light emitting element that emits the first inspection light to the recording medium and a second light emitting element that emits the second inspection light to the recording medium,
the light detector has a light receiving element that detects the first incident light and the second incident light, and
a period in which the first light emitting element emits the first inspection light is different from a period in which the second light emitting element emits the second inspection light.

9. The recording medium determination device according to claim 1, wherein
the light emitter has a light emitting element that emits light including the first inspection light and the second inspection light to the recording medium, and
the light detector has a first light receiving element that detects light in a wavelength region of the first incident light and a second light receiving element that detects light in a wavelength region of the second incident light.

10. An image formation device comprising:
the recording medium determination device as defined in claim 1; and
an image former that provides the recording medium with a color material to form an image.

11. A recording medium determination method in which a recording medium determination device is used, the recording medium determination device including a light emitter that emits inspection light to a recording medium, and a light detector that detects incident light including at least one of diffuse reflected light of the inspection light emitted to the recording medium or fluorescent light excited by the inspection light in the recording medium, the recording medium determination method comprising:
making a determination depending on a property of the recording medium based on a detection result of first incident light of the incident light in accordance with first inspection light of the inspection light and second incident light of the incident light in accordance with second inspection light of the inspection light obtained by the light detector,
wherein
the first inspection light has an intensity whose peak wavelength is more than or equal to 750 nm and less than or equal to 1100 nm,
the second inspection light has an intensity whose peak wavelength is shorter than the peak wavelength of the first inspection light, and
wherein
the determination depending on the property is based on a ratio between a first value in accordance with an amount of the first incident light received by the light detector and a second value in accordance with an amount of the second incident light received by the light detector.

12. A recording medium determination device comprising:
three or more light emitting elements that emit inspection light respectively having specific wavelengths to a recording medium;
a hardware processor that causes the three or more light emitting elements to sequentially emit the inspection light; and
a light receiving element that receives light having been emitted from the three or more light emitting elements,
wherein the hardware processor
determines a type of the recording medium from a relative relationship between an amount of received light concerning a light emitting element used as a reference among the three or more light emitting elements and an amount of received light concerning each of the light emitting elements other than the light emitting element used as the reference, and
causes the light emitting element used as the reference to emit the inspection light in a turn other than first and last turns in a sequence of causing the three or more light emitting elements to emit the inspection light, wherein the light emitting element used as the reference has an intensity of a peak wavelength more than or equal to 750 nm and less than or equal to 1100 nm.

13. The recording medium determination device according to claim 12, wherein the light receiving element detects an amount of reflected light from the recording medium as the amount of received light.

14. The recording medium determination device according to claim 12, wherein the light receiving element detects an amount of transmitted light through the recording medium as the amount of received light.

15. The recording medium determination device according to claim 12, wherein the hardware processor uses, as the relative relationship, a ratio of the amount of received light concerning each of the light emitting elements other than the light emitting element used as the reference to the amount of received light concerning the light emitting element used as the reference among the three or more light emitting elements.

16. The recording medium determination device according to claim 12, wherein the hardware processor uses, as the relative relationship, a difference value obtained by subtracting the amount of received light concerning the light emitting element used as the reference among the three or more light emitting elements from the amount of received light concerning each of the light emitting elements other than the light emitting element used as the reference.

17. The recording medium determination device according to claim 12, wherein
the hardware processor
executes control of causing the three or more light emitting elements to sequentially emit the inspection light a plurality of times,
calculates the relative relationship each time the control of causing the three or more light emitting elements to sequentially emit the inspection light is executed, and
determines the type of the recording medium from an average relative relationship obtained from relative relationships calculated the plurality of times.

18. The recording medium determination device according to claim 12, wherein
the light emitting element includes an odd number of light emitting elements, the recording medium determination device further comprising:
a conveyor that conveys the recording medium onto an optical path of inspection light emitted from the odd number of light emitting elements, wherein
the odd number of light emitting elements are divided into two light emitting element groups,
the two light emitting element groups are disposed opposite to each other in a direction perpendicular to a recording medium conveyance direction in a plan view as seen from the recording medium, an arrangement position of the light receiving element in the recording medium conveyance direction being interposed between the two light emitting element groups, and
the light emitting element used as the reference belongs to one of the light emitting element groups that has a larger number of light emitting elements.

19. The recording medium determination device according to claim 12, wherein the light emitting element used as the reference emits inspection light having a wavelength of more than or equal to 750 nm and less than or equal to 1100 nm.

* * * * *